(12) United States Patent
Dandurand et al.

(10) Patent No.: US 12,097,914 B2
(45) Date of Patent: Sep. 24, 2024

(54) TRACK FOR TRACTION OF A VEHICLE

(71) Applicant: CAMSO INC., Magog (CA)

(72) Inventors: Jules Dandurand, Sherbrooke (CA);
Andy Levesque, Coaticook (CA);
Pascal Labbe, Sherbrooke (CA)

(73) Assignee: CAMSO INC., Magog (CA)

( * ) Notice: Subject to any disclaimer, the term of this patent is extended or adjusted under 35 U.S.C. 154(b) by 668 days.

(21) Appl. No.: 17/155,856

(22) Filed: Jan. 22, 2021

(65) Prior Publication Data
US 2021/0221453 A1    Jul. 22, 2021

Related U.S. Application Data

(60) Provisional application No. 62/964,470, filed on Jan. 22, 2020.

(51) Int. Cl.
*B62D 55/26* (2006.01)
*B62D 55/24* (2006.01)
*B62M 27/02* (2006.01)

(52) U.S. Cl.
CPC ........... *B62D 55/26* (2013.01); *B62D 55/244* (2013.01); *B62M 27/02* (2013.01); *B62M 2027/027* (2013.01)

(58) Field of Classification Search
CPC ...... B62D 55/244; B62D 55/26; B62D 55/28; B62D 55/283; B62D 55/286; B60C 11/16; B60C 11/1631
See application file for complete search history.

(56) References Cited

U.S. PATENT DOCUMENTS

| | | | |
|---|---|---|---|
| 2,040,696 A | 5/1936 | Johnston | |
| 2,696,864 A * | 12/1954 | Crooker | B60C 11/16 152/210 |
| 3,186,466 A | 6/1965 | Keinan | |
| 3,196,921 A | 7/1965 | Lennart | |
| 3,400,443 A | 9/1968 | Miller, II | |
| 3,464,476 A | 9/1969 | Scheuba et al. | |
| 3,602,364 A | 8/1971 | Maglio et al. | |
| 3,741,270 A | 6/1973 | Cantz | |
| 3,757,841 A | 9/1973 | Cantz | |
| 3,810,298 A | 5/1974 | Cantz | |
| 3,837,386 A | 9/1974 | Lejeune | |
| 3,838,894 A | 10/1974 | Reedy | |

(Continued)

OTHER PUBLICATIONS

Camso, "2018 Camso Snowmobile Tracks", Jul. 2017, https://camso.co/content/files/2018_Camso_Snowmobile_Tracks_EN.pdf, pp. 1-40 (Year: 2017).*

(Continued)

*Primary Examiner* — Kip T Kotter
(74) *Attorney, Agent, or Firm* — Hahn Loeser & Parks, LLP

(57) ABSTRACT

A track for traction of a vehicle (e.g., a snowmobile), in which the track is studded, i.e., comprises studs, to enhance its traction, including to optimize acceleration, control, and/or braking of the vehicle, such as, for example, by increasing engagement of the studs with a ground on which the vehicle travels (e.g., increasing their number and/or exposure) and/or improving retention of the studs in the track (e.g., better orienting and/or anchoring them), while being lightweight, reducing noise, and/or withstanding high speeds.

46 Claims, 18 Drawing Sheets

(56) References Cited

U.S. PATENT DOCUMENTS

| | | | |
|---|---|---|---|
| 3,842,880 | A | 10/1974 | Keinanen |
| 3,973,808 | A | 8/1976 | Janssen et al. |
| 3,998,257 | A | 12/1976 | Mayra |
| 4,218,101 | A * | 8/1980 | Thompson .............. B62D 55/24 |
| | | | 305/180 |
| 5,234,266 | A | 8/1993 | Musselman et al. |
| 5,299,860 | A | 4/1994 | Anderson |
| 5,642,921 | A * | 7/1997 | Webb ................... B62D 55/286 |
| | | | 305/179 |
| 5,730,510 | A | 3/1998 | Courtemanche |
| 5,855,248 | A | 1/1999 | Rawson et al. |
| 5,897,177 | A | 4/1999 | Bergstrom |
| 5,980,001 | A * | 11/1999 | Rubel .................... B62D 55/27 |
| | | | 305/180 |
| 6,109,705 | A | 8/2000 | Courtemanche |
| 6,264,293 | B1 | 7/2001 | Musselman et al. |
| 6,264,294 | B1 | 7/2001 | Musselman et al. |
| 6,609,772 | B2 * | 8/2003 | Musselman ............ B62D 55/27 |
| | | | 305/180 |
| 6,814,115 | B2 | 11/2004 | Ostrovskis |
| 7,032,636 | B2 | 4/2006 | Salakari |
| 2004/0108772 | A1 | 6/2004 | Pribyl et al. |
| 2004/0217648 | A1 * | 11/2004 | Rasmussen ............ B62D 55/07 |
| | | | 305/165 |
| 2005/0120769 | A1 * | 6/2005 | Wankowski ......... B62D 55/286 |
| | | | 72/380 |
| 2008/0007119 | A1 * | 1/2008 | Schindler ............. B62D 55/244 |
| | | | 305/185 |
| 2012/0007421 | A1 * | 1/2012 | Meulemans ......... B62D 55/286 |
| | | | 29/525.01 |
| 2017/0197677 | A1 * | 7/2017 | Dandurand ............ B62D 55/07 |
| 2017/0297639 | A1 * | 10/2017 | Musselman ............ B62D 55/27 |

OTHER PUBLICATIONS

Request for re-examination filed Aug. 31, 2007 in connection with Canadian Patent No. 2,456,455, 32 pages.

Certificate of Re-Examination issued on Mar. 10, 2009 in connection with Canadian Patent 2,456,455, 3 pages.

Non-Final Office Action issued on Dec. 5, 2011 in connection with U.S. Appl. No. 12/974,964, 14 pages.

Non-Final Office Action issued on Jul. 5, 2012 in connection with U.S. Appl. No. 12/974,964, 14 pages.

Final Office Action issued on Mar. 11, 2013 in connection with U.S. Appl. No. 12/974,964, 12 pages.

Final Office Action issued Jan. 14, 2014 in connection with U.S. Appl. No. 12/974,964, 12 pages.

* cited by examiner

TRACK FOR TRACTION OF A VEHICLE

CROSS-REFERENCE TO RELATED APPLICATION

The present application claims the benefit of U.S. Provisional Application Ser. No. 64/964,470, filed Jan. 22, 2020, which is hereby incorporated by reference herein.

FIELD

This disclosure relates generally to tracks for traction of vehicles such as snowmobiles, all-terrain vehicles (ATVs), and other off-road vehicles.

BACKGROUND

Certain vehicles may be equipped with tracks which enhance their traction and floatation on soft, slippery and/or irregular grounds (e.g., snow, ice, soil, mud, sand, etc.) on which they operate.

For example, snowmobiles allow efficient travel on snowy and in some cases icy grounds. A snowmobile comprises a track system which engages the ground to provide traction. The track system comprises a track-engaging assembly and a track that moves around the track-engaging assembly and engages the ground to generate traction. The track typically comprises an elastomeric body in which are embedded certain reinforcements, such as transversal stiffening rods providing transversal rigidity to the track, longitudinal cables providing tensional strength, and/or fabric layers. The track-engaging assembly comprises wheels and in some cases slide rails around which the track is driven.

A snowmobile's track may face a number of challenges during riding. For example, when riding on an icy ground, the track may slide, thus reducing performances of the snowmobile and compromising the safety of the driver (and passengers if there are any) of the snowmobile.

Studded tracks exist, but they are typically heavy, time-consuming to manufacture or modify, relatively expensive, inefficient, and/or unable to withstand high speeds.

For these and other reasons, there is a need to improve tracks for traction of vehicles.

SUMMARY

In accordance with various aspects of this disclosure, there is provided a track for traction of a vehicle (e.g., a snowmobile), in which the track is studded, i.e., comprises studs, to enhance its traction, including to optimize acceleration, control, and/or braking of the vehicle, such as, for example, by increasing engagement of the studs with a ground on which the vehicle travels (e.g., increasing their number and/or exposure) and/or improving retention of the studs in the track (e.g., better orienting and/or anchoring them), while being lightweight, reducing noise, and/or withstanding high speeds.

For example, in accordance with an aspect of this disclosure, there is provided a track for traction of a vehicle. The track is movable around a track-engaging assembly comprising a plurality of track-contacting wheels. The track is elastomeric to flex around the track-engaging assembly and comprises a carcass comprising a ground-engaging outer surface for engaging a ground and an inner surface opposite to the ground-engaging outer surface, a plurality of traction projections projecting from the ground-engaging outer surface, and a plurality of studs mounted to the traction projections and oriented transversally to a thickness-wise direction of track.

In accordance with another aspect of the disclosure, there is provided a track for traction of a vehicle. The track is movable around a track-engaging assembly comprising a plurality of track-contacting wheels. The track is elastomeric to flex around the track-engaging assembly and comprises a carcass comprising a ground-engaging outer surface for engaging a ground and an inner surface opposite to the ground-engaging outer surface, a plurality of traction projections projecting from the ground-engaging outer surface, and a plurality of studs mounted to the traction projections. Each traction projection of the traction projections comprises a lower portion and an upper portion that is configured to flex relative to the lower portion of the traction projection when the traction projection engages the ground such that a stud of the studs that is mounted to the traction projection moves towards being oriented normal to the ground.

In accordance with another aspect of the disclosure, there is provided a track for traction of a vehicle. The track is movable around a track-engaging assembly comprising a plurality of track-contacting wheels. The track is elastomeric to flex around the track-engaging assembly and comprises a carcass comprising a ground-engaging outer surface for engaging a ground and an inner surface opposite to the ground-engaging outer surface, a plurality of traction projections projecting from the ground-engaging outer surface, and a plurality of studs mounted to the traction projections. Each of respective ones of the studs is inclined relative to a thickness-wise direction of track and a longitudinal direction of the track.

In accordance with another aspect of the disclosure, there is provided a track for traction of a vehicle. The track is movable around a track-engaging assembly comprising a plurality of track-contacting wheels. The track is elastomeric to flex around the track-engaging assembly and comprises a carcass comprising a ground-engaging outer surface for engaging a ground and an inner surface opposite to the ground-engaging outer surface, a plurality of traction projections projecting from the ground-engaging outer surface, and a plurality of studs mounted to the traction projections. A first subset of the studs are oriented in a first orientation and a second subset of the studs are oriented in a second orientation different from the first orientation.

In accordance with another aspect of the disclosure, there is provided a track for traction of a vehicle. The track is movable around a track-engaging assembly comprising a plurality of track-contacting wheels. The track is elastomeric to flex around the track-engaging assembly and comprises a carcass comprising a ground-engaging outer surface for engaging a ground and an inner surface opposite to the ground-engaging outer surface, a plurality of traction projections projecting from the ground-engaging outer surface, and a plurality of studs mounted to the traction projections and configured to generate at least fifty scratch lines per turn of the track around the track-engaging assembly.

In accordance with another aspect of the disclosure, there is provided a track for traction of a vehicle. The track is movable around a track-engaging assembly comprising a plurality of track-contacting wheels. The track is elastomeric to flex around the track-engaging assembly and comprises a carcass comprising a ground-engaging outer surface for engaging a ground and an inner surface opposite to the ground-engaging outer surface, a plurality of traction projections projecting from the ground-engaging outer surface, and a plurality of studs mounted to the traction projections.

A contact patch of the track with the ground includes at least 160 studs per square meter of the contact patch of the track.

In accordance with another aspect of the disclosure, there is provided a track for traction of a vehicle. The track is movable around a track-engaging assembly comprising a plurality of track-contacting wheels. The track is elastomeric to flex around the track-engaging assembly and comprises a carcass comprising a ground-engaging outer surface for engaging a ground and an inner surface opposite to the ground-engaging outer surface, a plurality of traction projections projecting from the ground-engaging outer surface, and a plurality of studs mounted to the traction projections. The traction projections are arranged in a plurality of rows spaced apart in and extending transversally to a longitudinal direction of the track. Each of plural ones of the rows of the traction projections includes more than six of the studs.

In accordance with another aspect of the disclosure, there is provided a track for traction of a vehicle. The track is movable around a track-engaging assembly comprising a plurality of track-contacting wheels. The track is elastomeric to flex around the track-engaging assembly and comprises a carcass comprising a ground-engaging outer surface for engaging a ground and an inner surface opposite to the ground-engaging outer surface, a plurality of traction projections projecting from the ground-engaging outer surface, and a plurality of studs mounted to the traction projections. A stud of the studs is mounted to a traction projection of the traction projections and comprises: an elongated body embedded within the traction projection. An enlarged head including a tip and exposed outside of the traction projection.

In accordance with another aspect of the disclosure, there is provided a track for traction of a vehicle. The track is movable around a track-engaging assembly comprising a plurality of track-contacting wheels. The track is elastomeric to flex around the track-engaging assembly and comprises a carcass comprising a ground-engaging outer surface for engaging a ground and an inner surface opposite to the ground-engaging outer surface, a plurality of traction projections projecting from the ground-engaging outer surface, and a plurality of studs mounted to the traction projections. A stud of the studs is mounted to a traction projection of the traction projections and comprises: a ground-engaging outer member including a tip and exposed outside of the traction projection; an enlarged base embedded within the traction projection; an elongated body embedded within the traction projection and extending from the ground-engaging outer member to the enlarged base; and a plurality of flanges projecting laterally from the elongated body.

In accordance with another aspect of the disclosure, there is provided a track for traction of a vehicle. The track is movable around a track-engaging assembly comprising a plurality of track-contacting wheels. The track is elastomeric to flex around the track-engaging assembly and comprises a carcass comprising a ground-engaging outer surface for engaging a ground and an inner surface opposite to the ground-engaging outer surface, a plurality of traction projections projecting from the ground-engaging outer surface, and a plurality of studs mounted to the traction projections. Each stud of the studs is mounted to a traction projection of the traction projections and comprises a ground-engaging outer member projecting outwardly from a top surface of the traction projection, exposed outside of the traction projection, and including a tip of the stud. A ratio of a height of the tip of the stud above the top surface of the traction projection over a length of the stud is at least 20%.

In accordance with another aspect of the disclosure, there is provided a track for traction of a vehicle. The track is movable around a track-engaging assembly comprising a plurality of track-contacting wheels. The track is elastomeric to flex around the track-engaging assembly and comprises a carcass comprising a ground-engaging outer surface for engaging a ground and an inner surface opposite to the ground-engaging outer surface, a plurality of traction projections projecting from the ground-engaging outer surface, and a plurality of studs mounted to the traction projections. A stud of the studs is mounted to a traction projection of the traction projections and comprises a ground-engaging outer member projecting outwardly from a top surface of the traction projection, exposed outside of the traction projection, and including a tip of the stud. A ratio of a height of the tip of the stud above the top surface of the traction projection over a height of the traction projection is at least 10%.

In accordance with another aspect of the disclosure, there is provided a track for traction of a vehicle. The track is movable around a track-engaging assembly comprising a plurality of track-contacting wheels. The track is elastomeric to flex around the track-engaging assembly and comprises a carcass comprising a ground-engaging outer surface for engaging a ground and an inner surface opposite to the ground-engaging outer surface, a plurality of traction projections projecting from the ground-engaging outer surface, and a plurality of studs mounted to the traction projections. A stud of the studs is mounted to a traction projection of the traction projections and comprises a ground-engaging outer member projecting outwardly from a top surface of the traction projection, exposed outside of the traction projection, and including a tip of the stud. A height of the tip of the stud above the top surface of the traction projection is at least $1/16$ inch.

These and other aspects of this disclosure will now become apparent to those of ordinary skill in the art upon review of the following description of embodiments in conjunction with the accompanying drawings.

BRIEF DESCRIPTION OF THE DRAWINGS

A detailed description of embodiments is provided below, by way of example only, with reference to the accompanying drawings, in which.

It is to be expressly understood that the description and drawings are only for the purpose of illustrating certain embodiments and are an aid for understanding. They are not intended to be limiting.

DETAILED DESCRIPTION OF EMBODIMENTS

Figure 1:
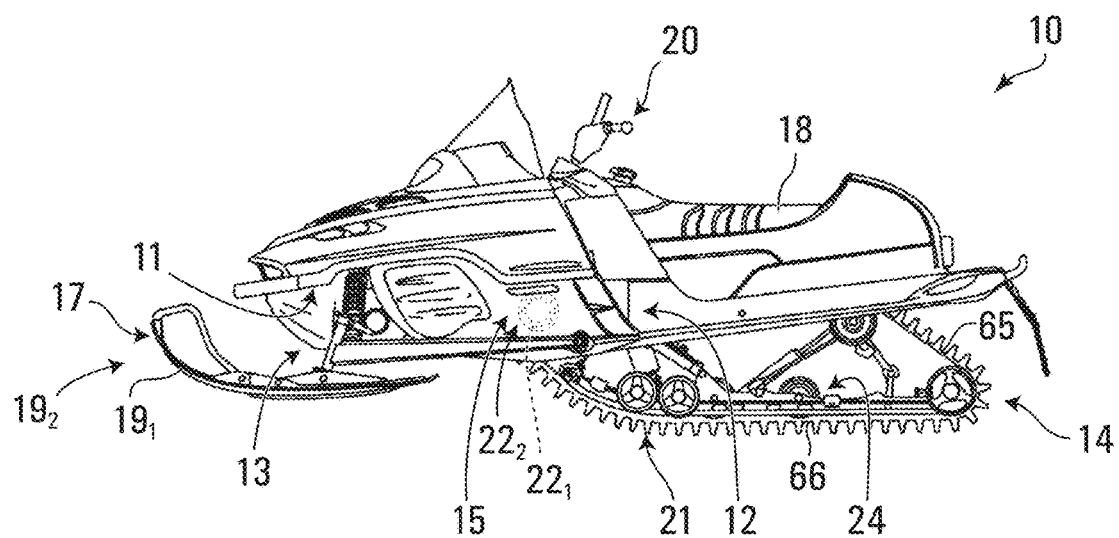
FIG. 1 shows an example of a snowmobile comprising a track system in accordance with an embodiment.

FIG. 1 shows an embodiment of a vehicle 10 comprising a track system 14 that comprises a track 21 to engage a ground on which the vehicle 10 travels. In this embodiment, the vehicle 10 is a snowmobile and the ground includes snow and/or ice. The snowmobile 10 is designed for travelling on snow and in some cases ice. The snowmobile 10 comprises a frame 11, a powertrain 12, the track system 14, a ski system 17, a seat 18, and a user interface 20, which enables a user to ride, steer and otherwise control the snowmobile 10.

In various embodiments, as further discussed below, the track 21 is studded, i.e., comprises studs 50, to enhance its traction, including to optimize acceleration, control, and/or braking of the snowmobile 10, such as, for example, by increasing engagement of the studs 50 with the ground (e.g., increasing their number and/or exposure) and/or improving retention of the studs 50 in the track 21 (e.g., better orienting and/or anchoring them), while being lightweight, reducing noise, and/or withstanding high speeds.

The powertrain 12 is configured for generating motive power and transmitting motive power to the track system 14 to propel the snowmobile 10 on the ground. To that end, the powertrain 12 comprises a prime mover 15, which is a source of motive power that comprises one or more motors (e.g., an internal combustion engine, an electric motor, etc.). For example, in this embodiment, the prime mover 15 comprises an internal combustion engine. In other embodiments, the prime mover 15 may comprise another type of motor (e.g., an electric motor) or a combination of different types of motor (e.g., an internal combustion engine and an electric motor). The prime mover 15 is in a driving relationship with the track system 14. That is, the powertrain 12 transmits motive power from the prime mover 15 to the track system 14 in order to drive (i.e., impart motion to) the track system 14. In some embodiments, at least part (e.g., a motor and/or a transmission) of the prime mover 15 may be included in the track system 14 (e.g., may be disposed within an envelope of the track 21).

The ski system 17 is turnable to allow steering of the snowmobile 10. In this embodiment, the ski system 17 comprises a pair of skis 191, 192 connected to the frame 11 via a ski-supporting assembly 13.

The seat 18 accommodates the user of the snowmobile 10. In this case, the seat 18 is a straddle seat and the snowmobile 10 is usable by a single person such that the seat 18 accommodates only that person driving the snowmobile 10. In other cases, the seat 18 may be another type of seat, and/or the snowmobile 10 may be usable by two individuals, namely one person driving the snowmobile 10 and a passenger, such that the seat 18 may accommodate both of these individuals (e.g., behind one another) or the snowmobile 10 may comprise an additional seat for the passenger.

The user interface 20 allows the user to interact with the snowmobile 10 to control the snowmobile 10. More particularly, the user interface 20 comprises an accelerator, a brake control, and a steering device that are operated by the user to control motion of the snowmobile 10 on the ground.

In this case, the steering device comprises handlebars, although it may comprise a steering wheel or other type of steering element in other cases. The user interface 20 also comprises an instrument panel (e.g., a dashboard) which provides indicators (e.g., a speedometer indicator, a tachometer indicator, etc.) to convey information to the user.

Figure 2:
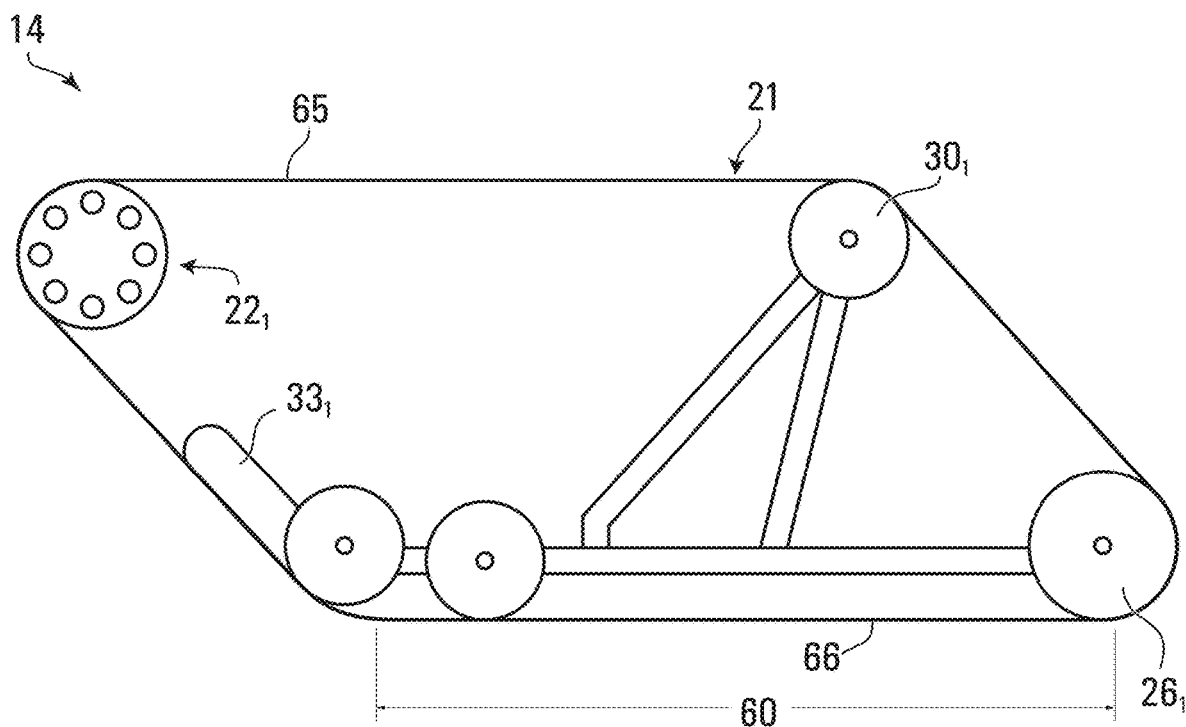
FIG. 2 shows a side view of the track system.
Figure 3:
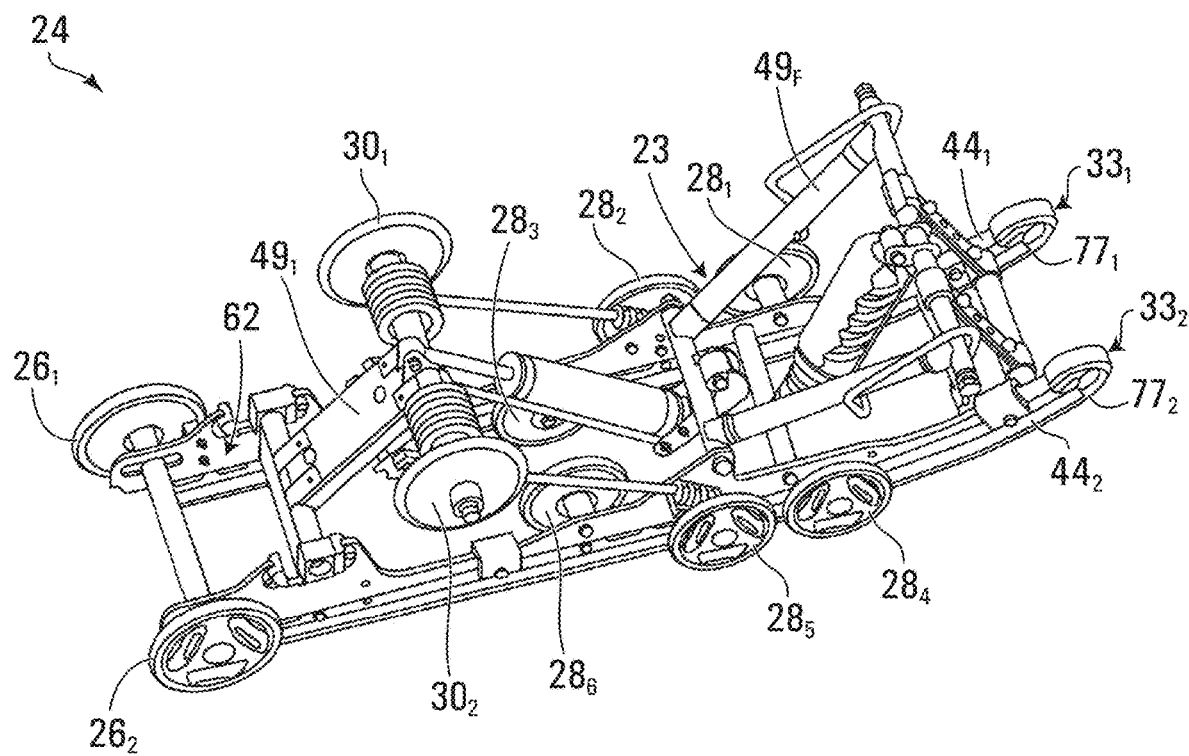
FIG. 3 shows a perspective view of a track-engaging assembly of the track system.
Figure 4:
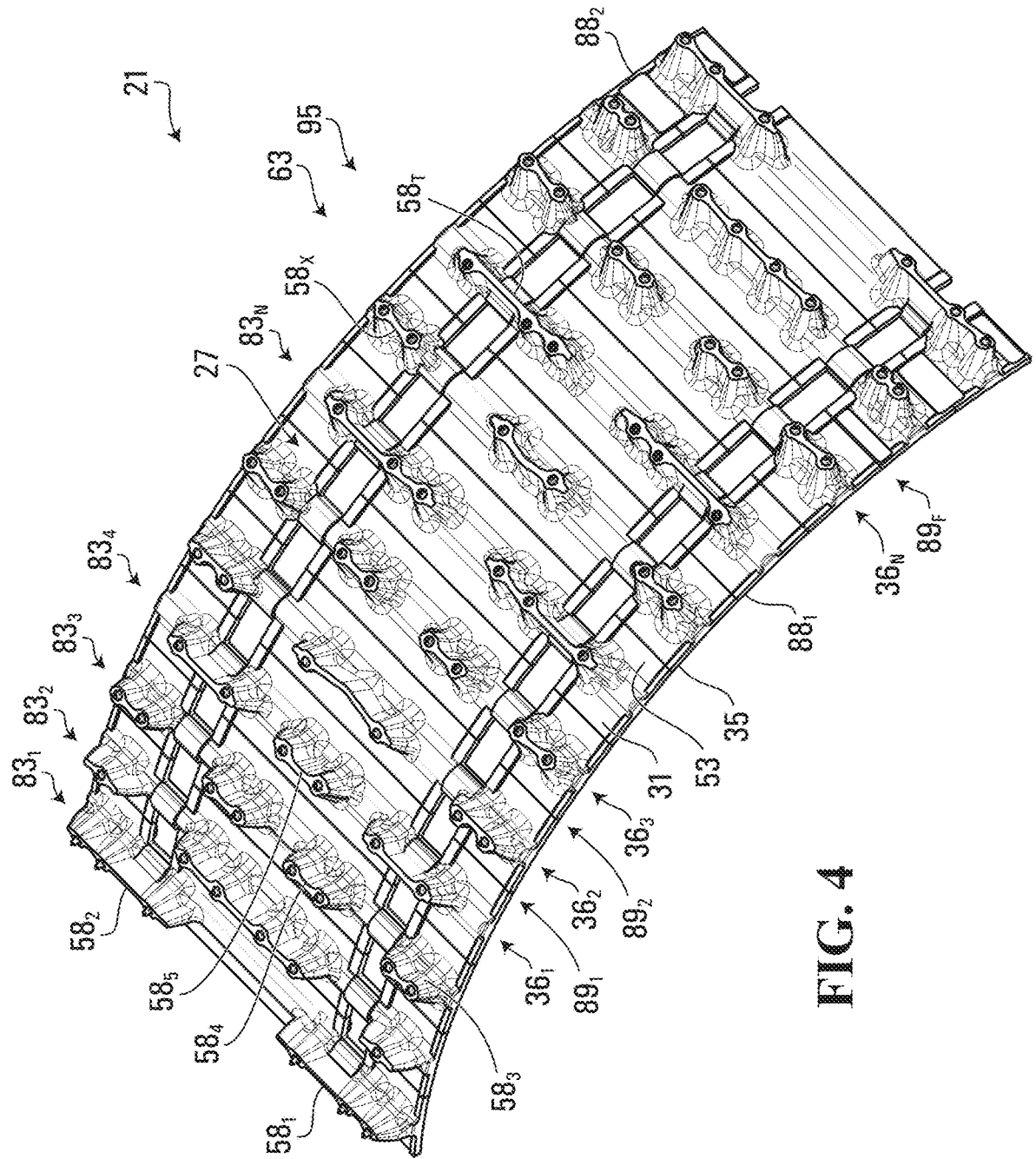
FIGS. 4 to 8 respectively show a top perspective view, a bottom perspective view, an elevation view and a plan view another elevation view of part of a track comprising traction projections and studs.
Figure 5:
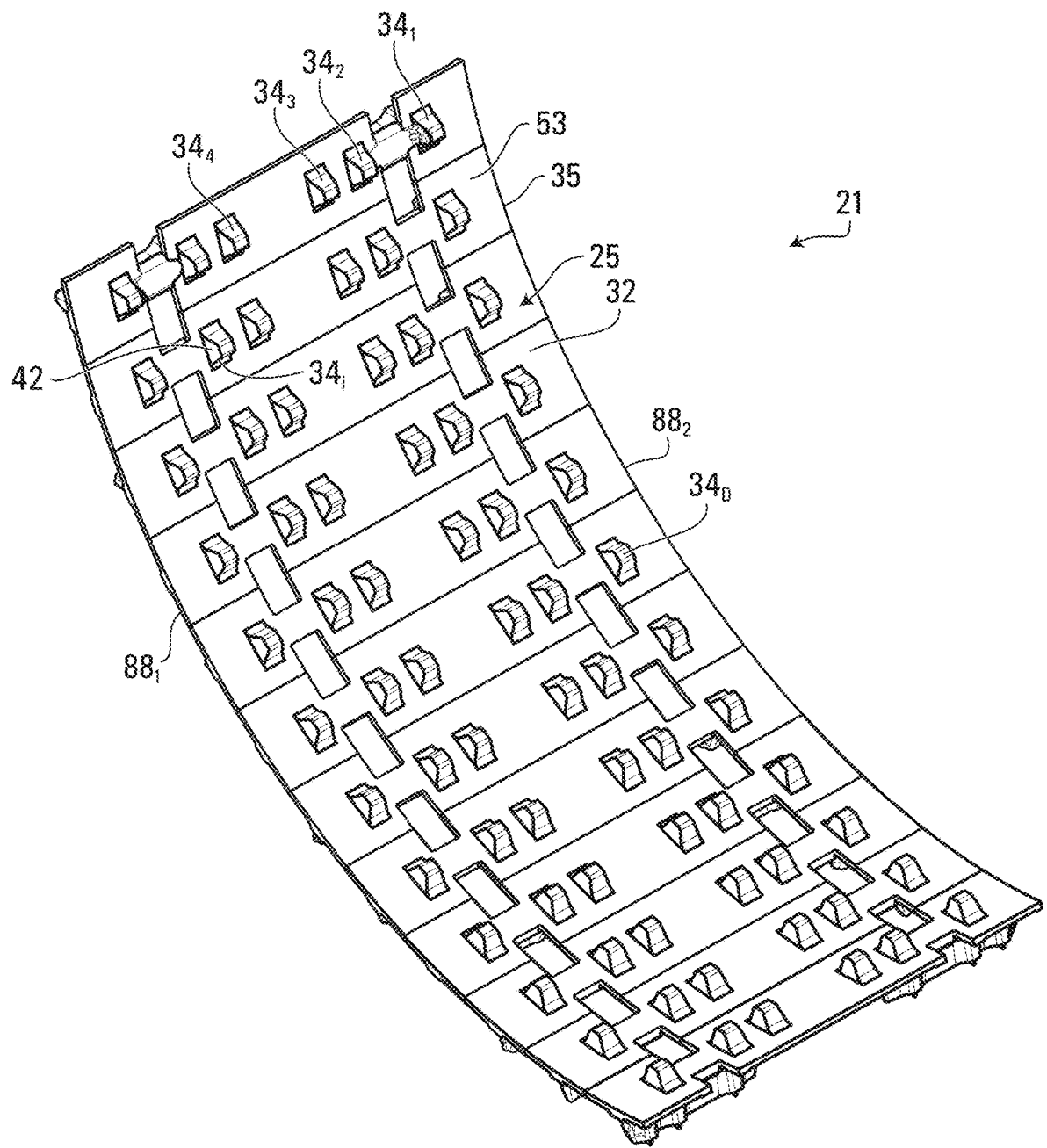
Figure 6:
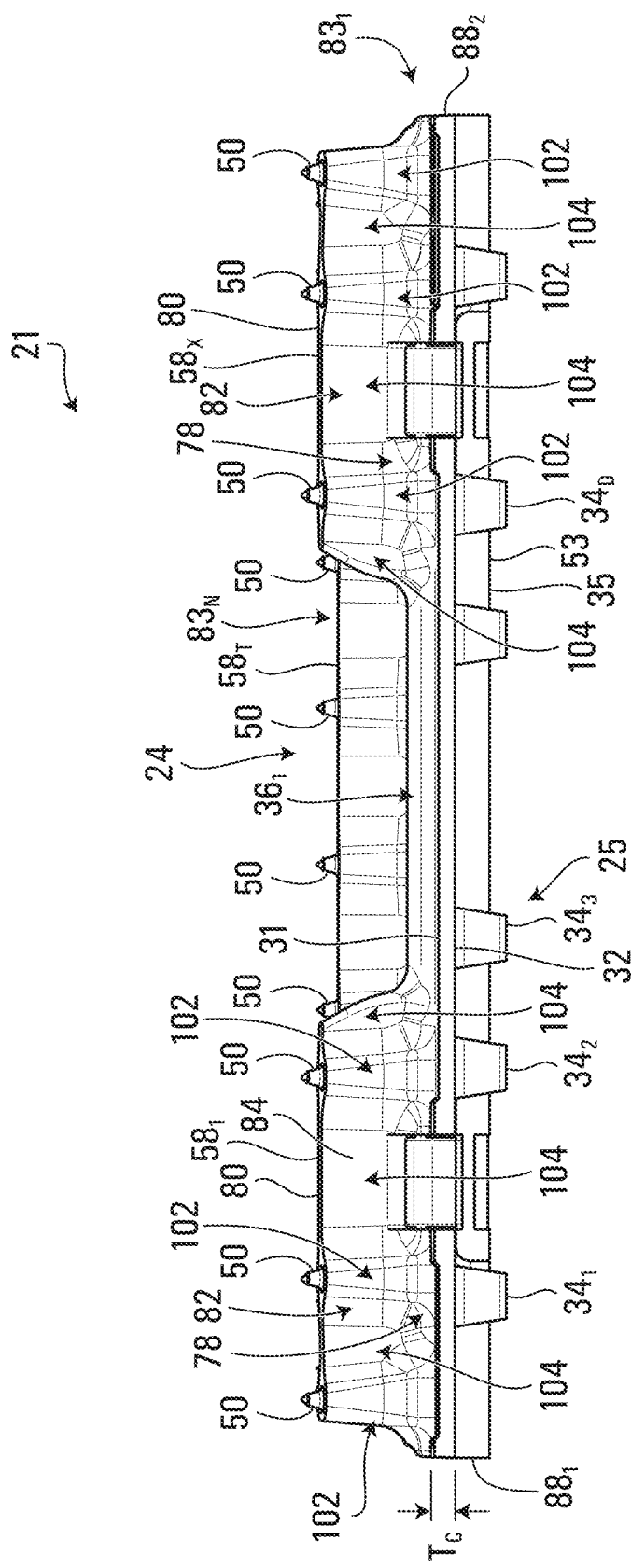
Figure 7:
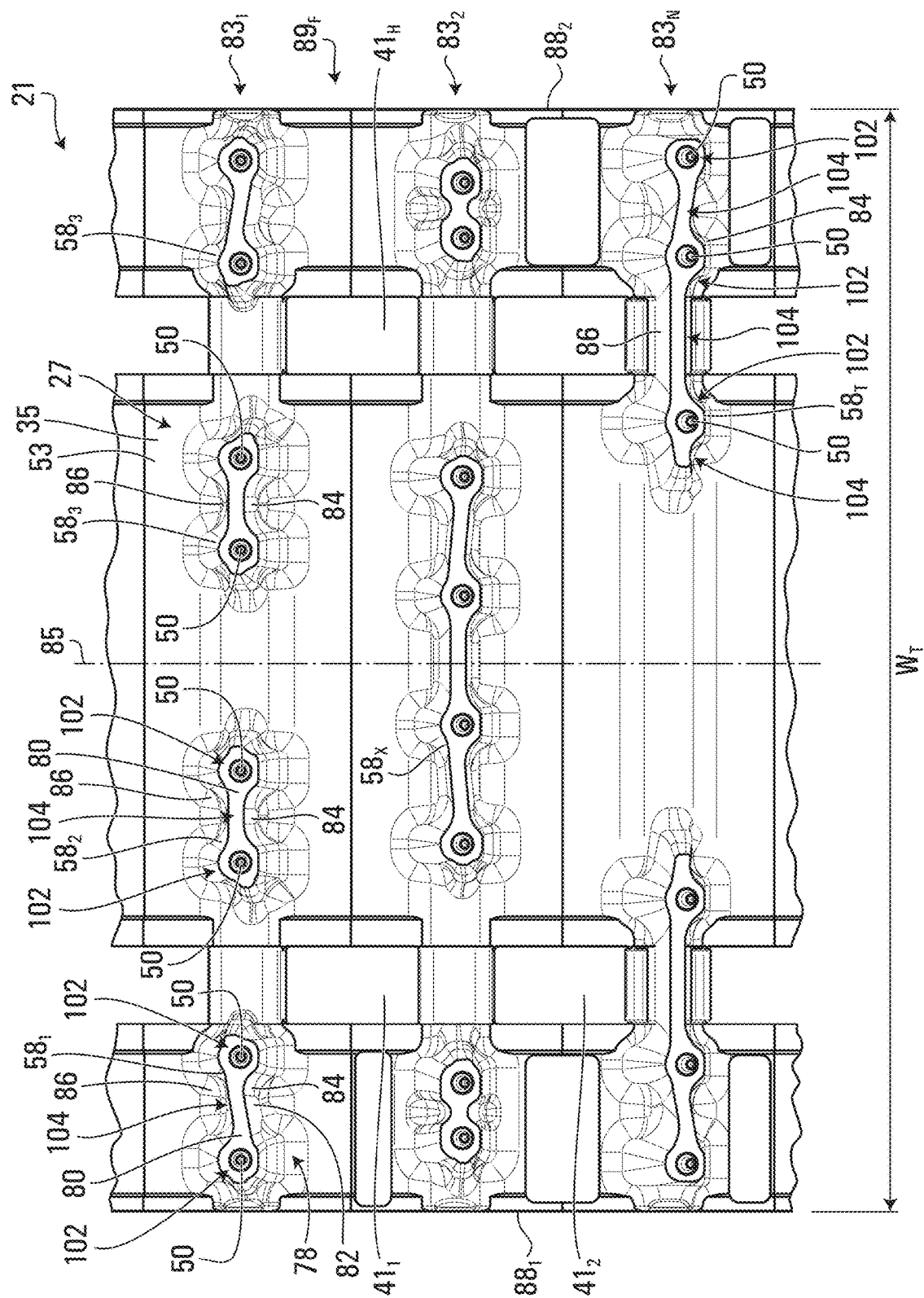
Figure 8:
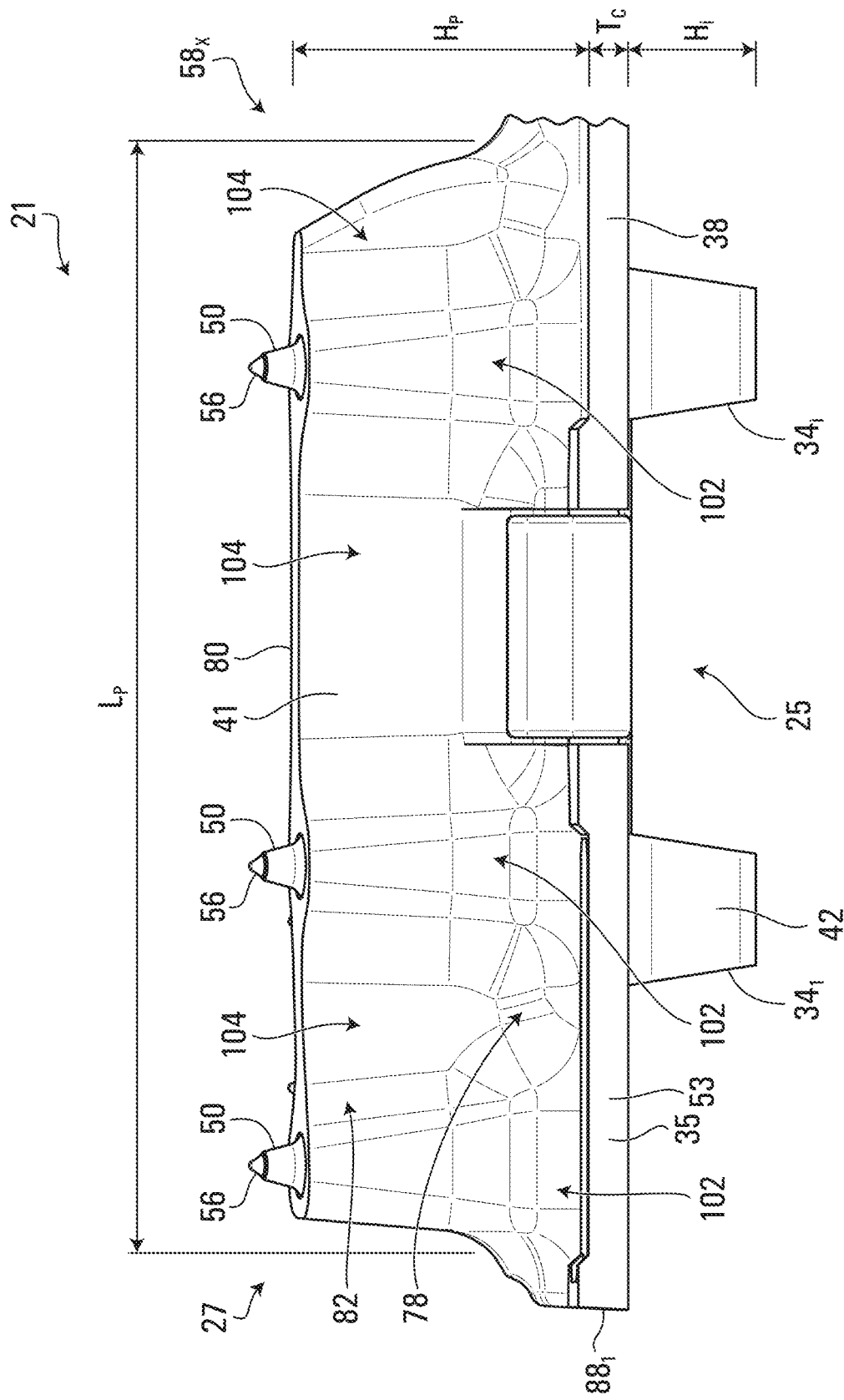

The track system 14 is configured to engage the ground to generate traction for the snowmobile 10. With additional reference to FIGS. 2 and 3, the track system 14 comprises the track 21 and a track-engaging assembly 24 for driving and guiding the track 21 around the track-engaging assembly 24. More particularly, in this embodiment, the track-engaging assembly 24 comprises a frame 23 and a plurality of track-contacting wheels which includes a plurality of drive wheels $22_1$, $22_2$ and a plurality of idler wheels that includes rear idler wheels $26_1$, $26_2$, lower roller wheels $28_1$-$28_6$, and upper roller wheels $30_1$, $30_2$. In this example, the frame 23 comprises an elongate support 62 including sliding surfaces $77_1$, $77_2$ for sliding on the track 21. As it is disposed between the track 21 and the frame 11 of the snowmobile 10, the track-engaging assembly 24 can be viewed as implementing a suspension for the snowmobile 10. The track system 14 has a longitudinal direction and a first longitudinal end and a second longitudinal end that define a length of the track system 14, a widthwise direction and a width that is defined by a width $W_T$ of the track 21, and a heightwise direction that is normal to its longitudinal direction and its widthwise direction.

The track 21 is configured to engage the ground to provide traction to the snowmobile 10. A length of the track 21 allows the track 21 to be mounted around the track-engaging assembly 24. In view of its closed configuration without ends that allows it to be disposed and moved around the track-engaging assembly 24, the track 21 can be referred to as an "endless" track. With additional reference to FIGS. 4 to 8, the track 21 comprises an inner side 25 for facing the track-engaging assembly 24, a ground-engaging outer side 27 for engaging the ground, and lateral edges $88_1$, $88_2$. A top run 65 of the track 21 extends between the longitudinal ends of the track system 14 and over the track-engaging assembly 24 (including over the wheels $22_1$, $22_2$, $26_1$, $26_2$, $28_1$-$28_6$, $30_1$, $30_2$), and a bottom run 66 of the track 21 extends between the longitudinal ends of the track system 14 and under the track-engaging assembly 24 (including under the wheels $22_1$, $22_2$, $26_1$, $26_2$, $28_1$-$28_6$, $30_1$, $30_2$). The bottom run 66 of the track 21 defines an area of contact 60 of the track 21 with the ground which generates traction and bears a majority of a load on the track system 14, and which will be referred to as a "contact patch" of the track 21 with the ground. The track 21 has a longitudinal axis 85 which defines a longitudinal direction of the track 21 (i.e., a direction generally parallel to its longitudinal axis) and transversal directions of the track (i.e., directions transverse to its longitudinal axis), including a widthwise direction of the track (i.e., a lateral direction generally perpendicular to its longitudinal axis). The track 21 has a thickness-wise direction normal to its longitudinal and widthwise directions.

The track 21 is elastomeric, i.e., comprises elastomeric material 53, to be flexible around the track-engaging assembly 24. The elastomeric material 53 of the track 21 can include any polymeric material with suitable elasticity. In this embodiment, the elastomeric material of the track 21 includes rubber. Various rubber compounds may be used and, in some cases, different rubber compounds may be present in different areas of the track 21. In other embodiments, the elastomeric material 53 of the track 21 may include another elastomer in addition to or instead of rubber (e.g., polyurethane elastomer).

More particularly, the track 21 comprises an endless body 35 underlying its inner side 25 and ground-engaging outer side 27. In view of its underlying nature, the body 35 will be referred to as a "carcass". The carcass 35 is elastomeric in that it comprises elastomeric material 38 which allows the carcass 35 to elastically change in shape and thus the track 21 to flex as it is in motion around the track-engaging assembly 24. The elastomeric material 38, which is part of the elastomeric material 53 of the track 21, can be any polymeric material with suitable elasticity. In this embodiment, the elastomeric material 38 includes rubber. Various rubber compounds may be used and, in some cases, different rubber compounds may be present in different areas of the carcass 35. In other embodiments, the elastomeric material 38 may include another elastomer in addition to or instead of rubber (e.g., polyurethane elastomer).

Figure 9:
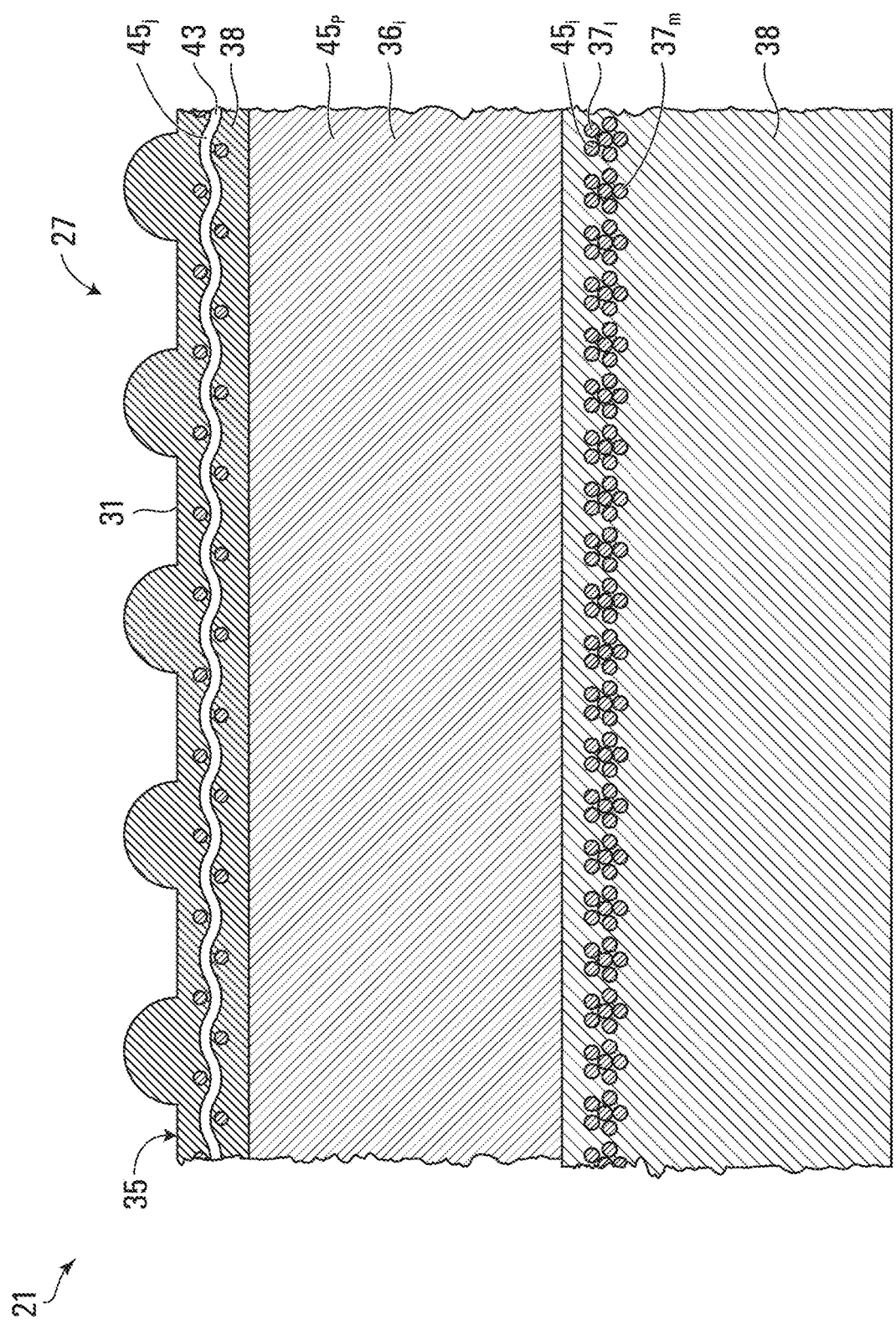
FIG. 9 shows a widthwise cross-sectional view of part of the track.

In this embodiment, as shown in FIG. 9, the carcass 35 comprises a plurality of reinforcements $45_1$-$45_P$ embedded in its rubber 38. These reinforcements $45_1$-$45_P$ can take on various forms.

For example, in this embodiment, a subset of the reinforcements $45_1$-$45_P$ is a plurality of transversal stiffening rods $36_1$-$36_N$ that extend transversally to the longitudinal direction of the track 21 to provide transversal rigidity to the track 21. More particularly, in this embodiment, the transversal stiffening rods $36_1$-$36_N$ extend in the widthwise direction of the track 21. Each of the transversal stiffening rods $36_1$-$36_N$ may have various shapes and be made of any suitably rigid material (e.g., metal, polymer or composite material).

As another example, in this embodiment, the reinforcements $45_i$, $45_j$ are reinforcing layers that are flexible in the longitudinal direction of the track 21.

For instance, in this embodiment, the reinforcement $45_i$ is a layer of reinforcing cables $37_1$-$37_M$ that are adjacent to one another and extend generally in the longitudinal direction of the track 21 to enhance strength in tension of the track 21 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible longitudinally (e.g., fibers or wires of metal, plastic or composite material). In some examples of implementation, respective ones of the reinforcing cables $37_1$-$37_M$ may be constituted by a single continuous cable length wound helically around the track 21. In other examples of implementation, respective ones of the transversal cables $37_1$-$37_M$ may be separate and independent from one another (i.e., unconnected other than by rubber of the track 21).

Also, in this embodiment, the reinforcement $45_j$ is a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 21 to have a reinforcing effect in a transversal direction of the track 21. For instance, the reinforcing fabric 43 may comprise a ply of reinforcing woven fibers (e.g., nylon fibers or other synthetic fibers). For example, the reinforcing fabric 43 may protect the transversal stiffening rods $36_1$-$36_N$, improve cohesion of the track 21, and counter its elongation.

The carcass 35 may be molded into shape in a molding process during which the rubber 38 is cured. For example, in this embodiment, a mold may be used to consolidate layers of rubber providing the rubber 38 of the carcass 35, the reinforcing cables $37_1$-$37_M$ and the layer of reinforcing fabric 43.

The inner side 25 of the track 21 comprises an inner surface 32 of the carcass 35 and a plurality of inner projections $34_1$-$34_D$ that project from the inner surface 32 and are positioned to contact the track-engaging assembly 24 (e.g., at least some of the wheels $22_1$, $22_2$, $26_1$, $26_2$, $28_1$-$28_6$, $30_1$, $30_2$) to do at least one of driving (i.e., imparting motion to) the track 21 and guiding the track 21. Since each of them is used to do at least one of driving the track 21 and guiding the track 21, the inner projections $34_1$-$34_D$ can be referred to as "drive/guide projections" or "drive/guide lugs". In some cases, a drive/guide lug $34_i$ may interact with a given one of the drive wheels $22_1$, $22_2$ to drive the track 21, in which case the drive/guide lug $34_i$ is a drive lug. In other cases, a drive/guide lug $34_i$ may interact with a given one of the idler wheels $26_1$, $26_2$, $28_1$-$28_6$, $30_1$, $30_2$ and/or another part of the track-engaging assembly 24 to guide the track 21 to maintain proper track alignment and prevent de-tracking without being used to drive the track 21, in which case the drive/guide lug $34_i$ is a guide lug. In yet other cases, a drive/guide lug $34_i$ may both (i) interact with a given one of the drive wheels $22_1$, $22_3$ to drive the track 21 and (ii) interact with a given one of the idler wheels $26_1$, $26_2$, $28_1$-$28_6$, $30_1$, $30_2$ and/or another part of the track-engaging assembly 24 to guide the track 21, in which case the drive/guide lug $34_i$ is both a drive lug and a guide lug. A height Hi of a drive/guide lug $34_x$ may have any suitable value.

In this embodiment, each of the drive/guide lugs $34_1$-$34_D$ is an elastomeric drive/guide lug in that it comprises elastomeric material 42. The elastomeric material 42, which is part of the elastomeric material 53 of the track 21, can be any polymeric material with suitable elasticity. More particularly, in this embodiment, the elastomeric material 42 includes rubber. Various rubber compounds may be used and, in some cases, different rubber compounds may be present in different areas of each of the drive/guide lugs $34_1$-$34_D$. In other embodiments, the elastomeric material 42 may include another elastomer in addition to or instead of rubber (e.g., polyurethane elastomer).

The drive/guide lugs $34_1$-$34_D$ may be provided on the inner side 25 in various ways. For example, in this embodiment, the drive/guide lugs $34_1$-$34_D$ are provided on the inner side 25 by being molded with the carcass 35.

In this embodiment, the carcass 35 has a thickness $T_c$ which is relatively small. The thickness $T_c$ of the carcass 35 is measured from the inner surface 32 to the ground-engaging outer surface 31 of the carcass 35 between longitudinally-adjacent ones of the traction projections $58_1$-$58_T$. For example, in some embodiments, the thickness $T_c$ of the carcass 35 may be no more than 0.25 inch, in some cases no more than 0.22 inch, in some cases no more than 0.20 inch, and in some cases even less (e.g., no more than 0.18 or 0.16 inch). The thickness $T_c$ of the carcass 35 may have any other suitable value in other embodiments.

The ground-engaging outer side 27 of the track 21 comprises a ground-engaging outer surface 31 of the carcass 35 and a plurality of traction projections $58_1$-$58_T$ that project from the ground-engaging outer surface 31 to enhance traction on the ground. The traction projections $58_1$-$58_T$, which may be referred to as "traction lugs" or "traction profiles", may have any suitable shape (e.g., straight shapes, curved shapes, shapes with straight parts and curved parts, etc.).

In this embodiment, each traction projection of the traction projections $58_1$-$58_T$, which will be denoted $58_x$, comprises a lower portion 78 and an upper portion 82 that is configured to flex relative to the lower portion 78 of the traction projection $58_x$ when the traction projection $58_x$ engages the ground. In particular, the lower portion 78 of the traction projection $58_x$ may include a base at which the traction projection $58_x$ projects from the ground-engaging outer surface 31.

The traction projection $58_x$ may also comprise a top surface 80 that is farthest from the ground-engaging outer surface 31 as well as a front surface 84 and a rear surface 86 opposite one another. In this embodiment, the top surface 80 of the traction projection $58_x$ extends transversally to the longitudinal direction of the track 21. More particularly, in this embodiment, the top surface 80 of the traction projection $58_x$ is inclined relative to the thickness-wise direction of the track 21. That is, the top surface 80 of the traction projection $58_x$ is neither orthogonal nor parallel relative to the thickness-wise direction of the track 21. A given one of the front surface 84 and the rear surface 86 of the traction projection $58_x$ may also be inclined relative to the thickness-wise direction of track 21. More particularly, in this embodiment, each one of the front surface 84 and the rear surface 86 of the traction projection $58_x$ is inclined relative to the thickness-wise direction of track 21.

Each of the traction projections $58_1$-$58_T$ may have a height $H_p$ in the heightwise direction of the track 21, a dimension $L_p$ in the widthwise direction of the track 21, and a dimension $W_p$ in the longitudinal direction of the track 21. In this embodiment, each of the traction projections $58_1$-$58_T$ has a longitudinal axis 75 such that it is elongated and its dimension $L_p$ in the widthwise direction of the track 21 is a length of that traction projection and its dimension $W_p$ in the longitudinal direction of the track 21 is a width of that traction projection. In this example, the longitudinal axis 75 of each of the traction projections $58_1$-$58_T$ extends transversally to the longitudinal direction of the track 21. More particularly, in this case, the longitudinal axis 75 of each of the traction projections $58_1$-$58_T$ extends in the widthwise direction of the track 21.

In this embodiment, the ground-engaging outer side 27 of the track 21 comprises a plurality of traction rows $83_1$-$83_N$ (which may sometimes be referred to as "traction profiles") that include respective ones of the traction projections $58_1$-$58_T$ and that are spaced from one another in the longitudinal direction of the track 21. Each of the traction rows $83_1$-$83_N$ includes one or more of the traction projections $58_1$-$58_T$ and extends transversally to the longitudinal direction of the track 21. In this example, each of the traction rows $83_1$-$83_N$ is oriented to the widthwise direction of the track 21. Also, in this example, adjacent ones of the traction rows $83_1$-$83_N$ are spaced from one another at a spacing (i.e., pitch) in the longitudinal direction of the track 21 and by traction-projection-free areas $89_1$-$89_F$ (i.e., areas free of traction projections) of the ground-engaging outer side 27 of the track 21. Furthermore, in this example, a given one of the traction rows $83_1$-$83_N$ may comprise plural ones of the traction projections $58_1$-$58_T$ and one or more voids between adjacent ones of its traction projections.

Each of the traction projections $58_1$-$58_T$ is an elastomeric traction projection in that it comprises elastomeric material 41. The elastomeric material 41, which is part of the elastomeric material 53 of the track 21, can be any polymeric material with suitable elasticity. More particularly, in this embodiment, the elastomeric material 41 includes rubber. Various rubber compounds may be used and, in some cases, different rubber compounds may be present in different areas of each of the traction projections $58_1$-$58_T$. In other embodiments, the elastomeric material 41 may include another elastomer in addition to or instead of rubber (e.g., polyurethane elastomer).

The traction projections $58_1$-$58_T$ may be provided on the ground-engaging outer side 27 in various ways. For example, in this embodiment, the traction projections $58_1$-$58_T$ are provided on the ground-engaging outer side 27 by being molded with the carcass 35.

Figure 10:
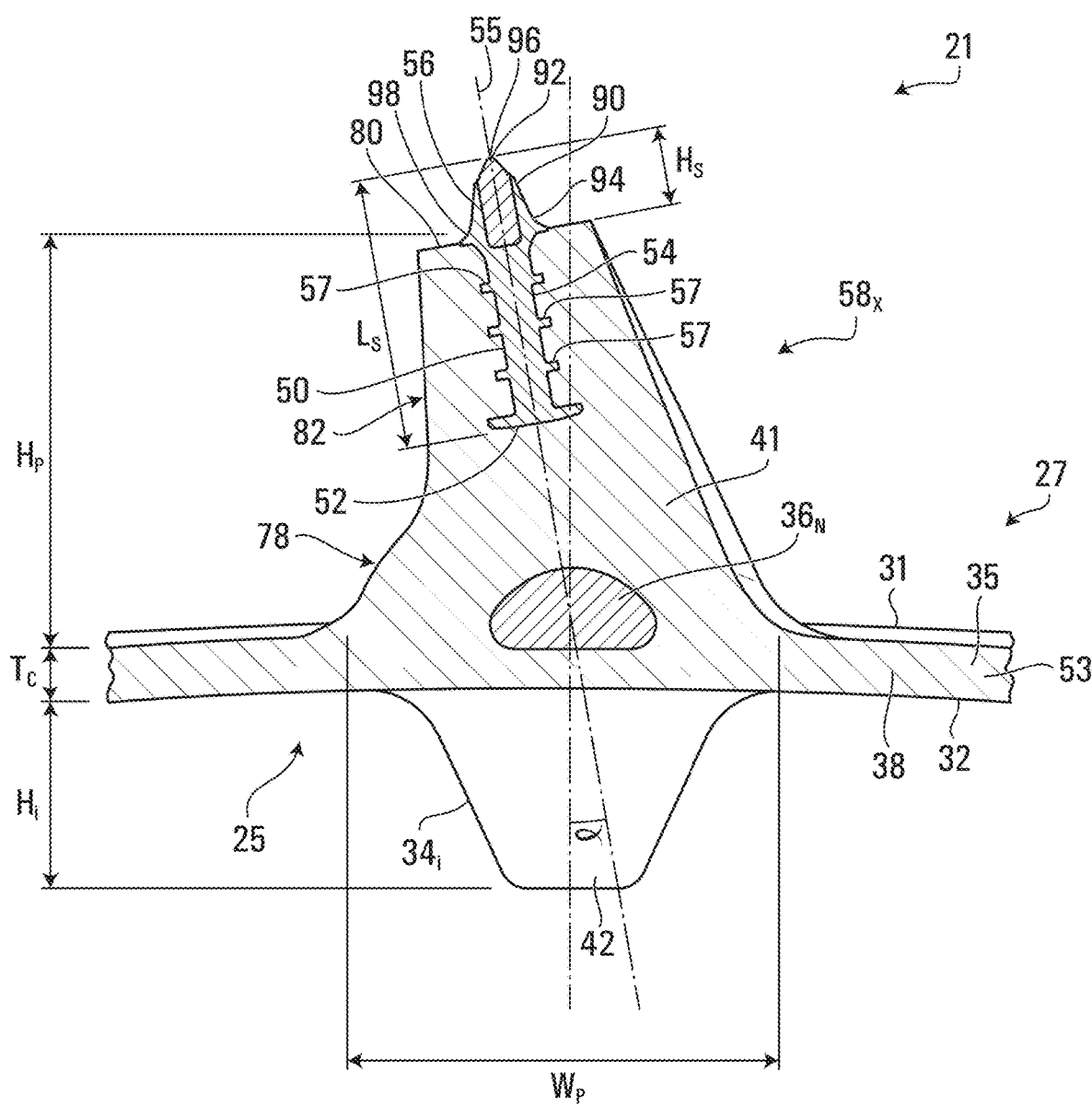
FIG. 10 shows a longitudinal cross-sectional view of part of the track.

In this embodiment, as shown in FIG. 10, the track 21 comprises studs 50 to enhance its traction, including to optimize acceleration, control, and/or braking of the snowmobile 10.

In particular, in this embodiment, at least some of (i.e., some of, a majority of or an entirety of) the studs 50 may be mounted to respective ones of the traction projections $58_1$-$58_T$ and oriented transversally to the thickness-wise direction of track 21. That is, a given one of the studs 50 may be oriented transversally to the thickness-wise direction of the track 21 in that a longitudinal axis 55 of the given one of the studs 50 extends transversally to the thickness-wise direction of track 21. More specifically, in this embodiment, at least a majority of (i.e., a majority of or an entirety of) the studs 50 are mounted to respective traction projections $58_1$-$58_T$ and oriented transversally to the thickness-wise direction of track 21. More particularly, in this embodiment, each stud 50 is mounted to a given one of the traction projections $58_1$-$58_T$ and oriented transversally to the thickness-wise direction of track 21. More specifically, in this embodiment, each stud 50 is inclined relative to the thickness-wise direction of the track 21 and relative to the longitudinal direction of the track 21 in that the stud 50 comprises a tip 92 and a base 52 that is longitudinally offset (i.e., offset in the longitudinal direction of the track 21) relative to its tip 92.

In this example, each stud 50 comprises a ground-engaging outer member 56 exposed outside of the traction projection $58_x$, the base 52 embedded within the traction projection $58_x$, an elongated body 54 (e.g., a shank) embedded within the traction projection $58_x$ and extending from the ground-engaging outer member 56 to the base 52, and a plurality of flanges 57 projecting laterally from the elongated body 54.

In this embodiment, the base 52 is an enlarged base, i.e., the base 52 of the stud 50 may be enlarged in that a cross-section of the base 52 of the stud 50 normal to the longitudinal 55 of the stud 50 is larger than a cross-section of the elongated body 54 of the stud 50 normal to the longitudinal axis 55 of the stud 50.

Also, in this embodiment, the ground-engaging outer member 56 of the stud 50 comprises a head 90 of the stud 50. In this case, the head 90 is an enlarged head, i.e., the head 90 of the stud 50 may be enlarged in that a cross-section of the head 90 of the stud 50 normal to the longitudinal axis 55 of the stud 50 is larger than a cross-section of the elongated body 54 of the stud 50 normal to the longitudinal axis 55 of the stud 50. In this embodiment, the enlarged head 90 is exposed outside of the traction projection $58_x$ and includes the tip 92 of the stud 50 and an enlarged portion 94 larger than the tip 92.

In this case, the flanges 57 of the stud 50 may include at least three flanges. In other cases, the stud 50 may include no flange or any other number of flanges (e.g., one, two, or more than three flanges) like the flanges 57.

Figure 11:
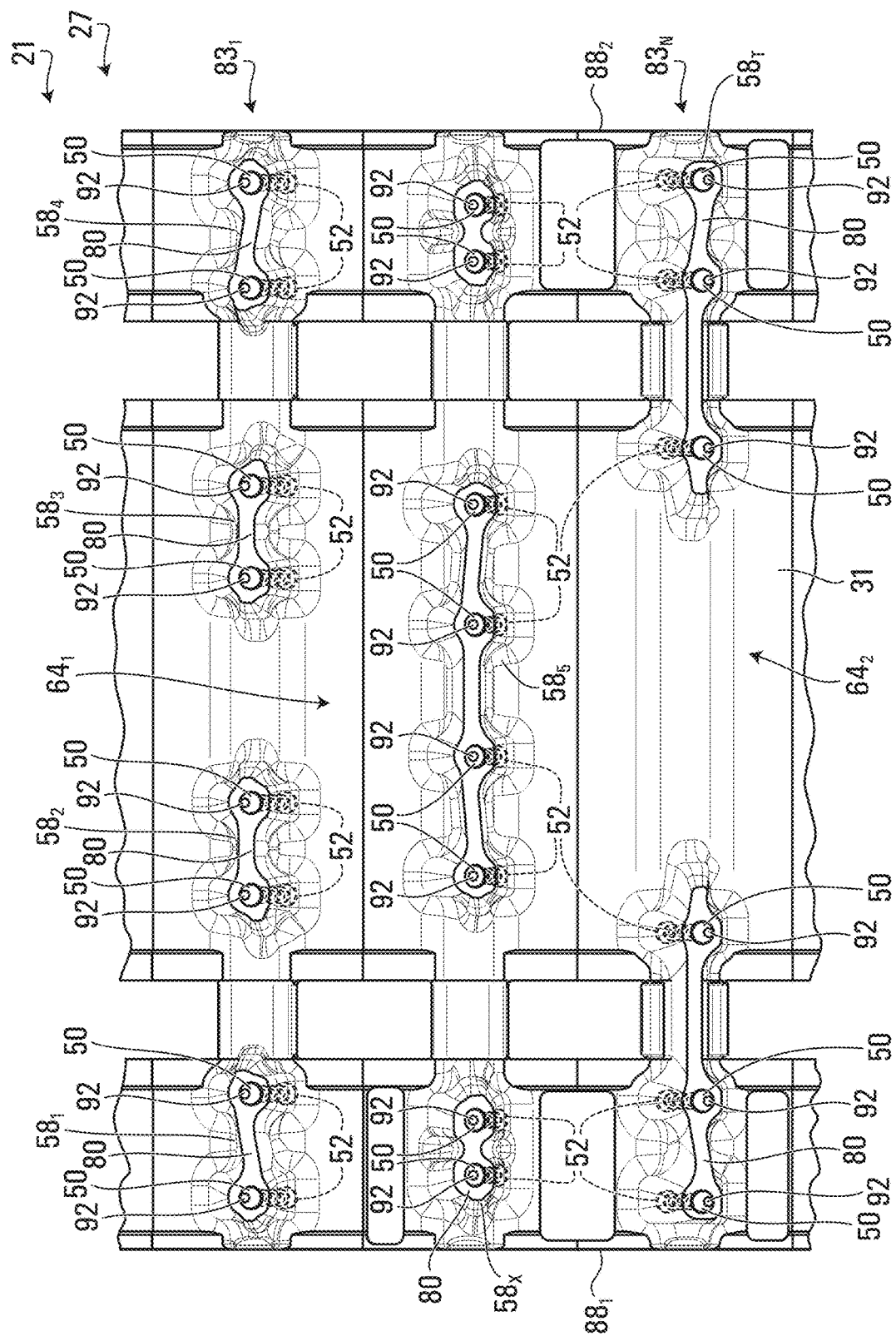
FIG. 11 shows a configuration of the studs in the track.

In this embodiment, as shown in FIG. 11, the configuration, the geometry and/or the material composition of the studs 50 may vary.

For instance, in this embodiment, the studs 50 may comprise subsets 64$_1$, 64$_2$ of studs, each subset comprising at least some of the studs 50 having similar configurations, similar geometries and/or similar material compositions. For example, each stud 50 of a first one of the subsets 64$_1$, 64$_2$ of the studs 50 may be oriented in a first orientation and each stud 50 of a second one of the subsets 64$_1$, 64$_2$ of the studs 50 may be oriented in a second orientation different from the first orientation.

In particular, in this embodiment, the subset 64$_1$ of studs 50 may be mounted to respective traction projections 58$_1$-58$_T$ in a configuration such that when the vehicle 10 moves forward and the upper portions 82 of the respective traction projections 58$_1$-58$_T$ flex relative to the bases 78 of the respective traction projections 58$_1$-58$_T$ as the respective traction projections 58$_1$-58$_T$ engage the ground, the subset 64$_1$ of studs 50 move towards being oriented normal to the ground. In a similar but opposite fashion, a subset 64$_2$ of studs 50 may be mounted to respective traction projections 58$_1$-58$_T$ in a configuration such that when the vehicle 10 moves backwards and the upper portions 82 of the respective traction projections 58$_1$-58$_T$ flex relative to the bases 78 of the respective traction projections 58$_1$-58$_T$ as the respective traction projections 58$_1$-58$_T$ engage the ground, the subset 64$_2$ of studs 50 move towards being oriented normal to the ground.

In this embodiment, each stud 50 of the subset 64$_1$ of studs 50 may be inclined relative to the thickness-wise direction of track 21 and relative to the longitudinal direction of the track in that its tip 92 is longitudinally offset relative to its base 52 in the longitudinal direction of track 21 such that when the stud 50 is located on the bottom run 66 of the track 21, its tip 92 is positioned more rearward (i.e., towards a rear of the vehicle 10) than its base 92, and such that the longitudinal axis 55 of the stud 50 is angled relative to the heightwise direction of the track 21. An angle α between the longitudinal axis 55 of each stud 50 of the subset 64$_1$ and the heightwise direction of the track 21 may have any suitable value. For instance, in some embodiments, the angle α may be at least $5^Q$, in some embodiments at least $10^Q$, in some embodiments at least $13^Q$, in some embodiments at least $15^Q$, and in some embodiments even more (e.g., at least $17^Q$).

Further, in this embodiment, each stud 50 of the subset 64$_2$ of studs 50 may have its tip 92 longitudinally offset relative to its base 52 in the longitudinal direction of track 21 such that when the stud 50 is located on the bottom run 66 of the track 21, its tip 92 is positioned more forward (i.e., towards a front of the vehicle 10) than its base 92 and such that the longitudinal axis 55 of the stud 50 is angled relative to the heightwise direction of the track 21 by an angle that is, in some embodiments, at least $2^Q$, in some embodiments at least $5^Q$, in some embodiments at least $10^Q$, in some embodiments at least $13^Q$, in some embodiments at least $15^Q$, and in some embodiments even more (e.g., at least $17^Q$).

Each one of the subsets 64$_1$, 64$_2$ of studs 50 may represent any suitable proportion of the studs 50. For example, the subset 64$_1$ of studs 50 and the subset 64$_2$ of studs 50 may differ in number. Specifically, in this embodiment, the subset 64$_1$ of studs 50 is larger in number than the subset 64$_2$ of studs 50. For example, in some embodiments, the subset 64$_1$ of studs 50 may represent in number at least three fifths, in some embodiments at least two thirds, in some embodiments at least three quarters, in some embodiments even more (e.g., at least 5/6) of a total amount of studs 50. Also, in some embodiments a ratio of the number of studs 50 in the subset 64$_1$ over the number of studs 50 in the subset 64$_2$ may be at least 1.5, in some embodiments at least 2, in some embodiments at least 3 and in some embodiments even more (e.g., at least 4).

The track 10 may be configured to generate a number of scratch lines that may be high even though the width $W_T$ of the track 21 is limited. The number of scratch lines refers to the number of marks laterally spaced in the lateral direction of the track 21 left by the studs 50 on the ground when the track 24 turns around the track-engaging assembly 24. Without being bound by theory, it has been found that increasing the number of scratch lines increases performances (e.g., traction on ice) of the track 21. For example, in some embodiments, the studs 50 are configured to generate at least fifty, in some embodiments at least sixty, in some embodiments at least seventy, in some embodiments at least eighty, in some embodiments even more (e.g., ninety) scratch lines per turn of the track 21 around the track-engaging assembly 24.

This may be achieved by having a relatively high number of studs 50 per surface unit of the contact patch of the track 21. For example, in some embodiments, the contact patch of the track 21 with the ground includes at least 160 studs 50 per square meter, in some embodiments at least 200 studs 50 per square meter, in some embodiments at least 220 studs 50 per square meter, in some embodiments at least 240 studs 50 per square meter, in some embodiments even more studs 50 per square meter of the contact patch of the track 21.

This may also be achieved by disposing the studs 50 strategically. For example, in some embodiments, each of plural ones of the rows 83$_1$-83$_N$ of the traction projections 58$_1$-58$_T$ includes at least six, in some embodiments at least eight, and in some embodiments even more (e.g., at least nine) of the studs 50. As another example, the studs 50 may be arranged in a pattern 95 that spans a relatively high number of the rows 83$_1$-83$_N$ of the traction projections 58$_1$-58$_T$ (i.e., the disposition of the studs 50 in each one of the rows 83$_1$-83$_N$ spanned by the pattern 95 is different from the dispositions of the studs 50 of the other ones of the rows 83$_1$-83$_N$ spanned by the pattern 95) and repeats along the track 21. For example, in some embodiment, the pattern 95 of the studs 50 is defined over at least six, in some embodiments at least eight, in some embodiments at least ten, in some embodiments at least twelve, in some embodiments even more (e.g., at least fourteen) of the rows 83$_1$-83$_N$ of the traction projections 58$_1$-58$_T$.

A height Hs of the tip 92 of a stud 50 above the top surface 80 of a traction projection 58$_x$ in which the stud 50 is mounted may be relatively high in order to improve performances (e.g., traction on ice) of the track 21. For example, in some embodiments, a ratio of the height Hs of the tip 92 of the stud 50 above the top surface 80 of the traction projection 58$_1$-58$_T$ over a length Ls of the stud 50 is at least 20%, in some embodiments at least 25%, in some embodiments at least 30%, and in some embodiments even more (e.g., at least 35%). As another example, in some embodiments, a ratio of the height Hs of the tip 92 of the stud 50 above the top surface 80 of the traction projection 58$_1$-58$_T$ over the height $H_p$ of the traction projection 58$_1$-58$_T$ is at least 10%, in some embodiments at least 15%, in some embodiments at least 20%, and in some embodiments even more (e.g., at least 25%). As another example, in some embodiments, the height Hs of the tip 92 of the stud 50 above the top surface 80 of the traction projection $58_1$-$58_T$ may be at least 1/16 inch, in some embodiments at least 1/8 inch, in some embodiments at least 1/4 inch, and in some embodiments even more (e.g., at least 3/8 inch).

The studs 50 may comprise any suitable material. For instance, in this embodiment, the studs 50 may comprise a metal and a carbide. In this embodiment, the tip 92 of the enlarged head 90 of each stud 50 comprises a material 96 and the enlarged portion 94 of the enlarged head 90 of each stud 50 comprises a material 98. Specifically, in this embodiment, the material 96 of the tip 92 of each stud 50 may comprise at least part of the carbide of the stud 50 and the material 98 of the enlarged portion 94 of each stud 50 may comprise at least part of the metal of the stud 50

In this embodiment, the traction projections $58_1$-$58_T$ may comprise stud-mounting portions 102 to which are mounted the studs 50, and transversal portions 104 that extend from the stud-mounting portions 102 of the projections $58_1$-$58_T$ and transversally to the longitudinal direction of the track 21. In particular, each stud-mounting portion 102 of the traction projections $58_1$-$58_T$ may be configured to receive at least one stud 50, and the transversal portions 104 may be smaller in the longitudinal direction of the track than the stud-mounting portions 102 from which they extend. Each traction projection $58_x$ may comprise any suitable number (e.g., one, two, three, four, five, six, seven, eight or more) of stud-mounting portions 102 and at least some transversal portions 104 of the traction projection $58_x$ may connect different stud-mounting portions 102 to one another (e.g., may extend from one of the stud-mounting portions 102 to another one of the stud-mounting portions 102). Each stud-mounting portion 102 may also be configured to receive any suitable number of (e.g., one, two, three or more than three) studs 50. For example, in this embodiment, each stud-mounting portion 102 of the traction projections $58_1$-$58_T$ is configured to receive one stud 50, each projection $58_x$ comprises as many stud-mounting portions 102 as the number of studs it is configured to receive, and at least "n−1" transversal portions 104 (n representing the number of stud-mounting portions 102 of the traction projection $58_x$).

Figure 12:
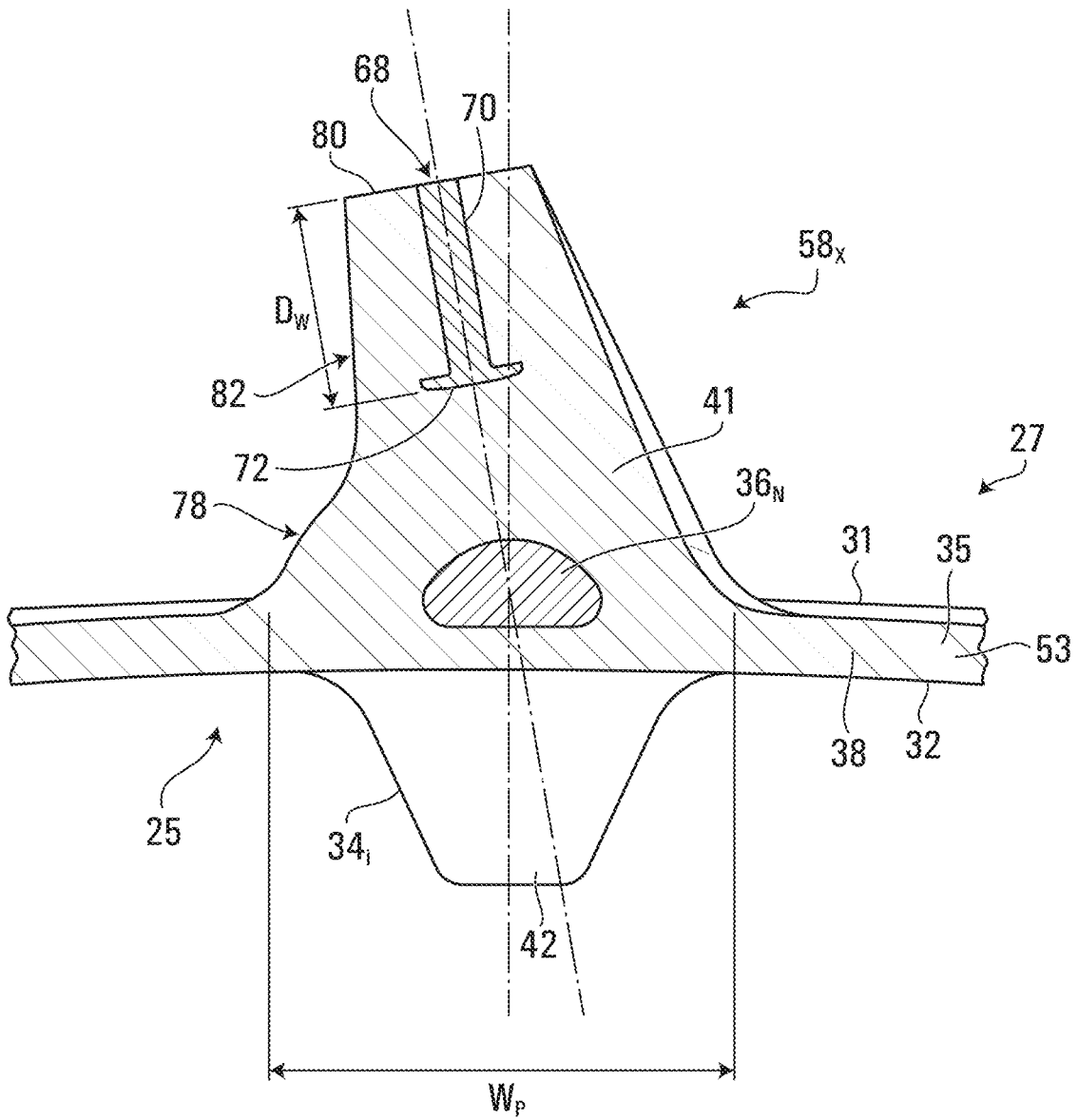
FIG. 12 shows a longitudinal cross-sectional view of part of the track without the studs.

As shown in FIG. 12, in this embodiment, in order to position the studs 50 in the traction projections $58_1$-$58_T$ in an efficient and precise manner, the stud-mounting portions 102 of the traction projections $58_1$-$58_T$ may comprise preformed holes 68 to receive the studs 50. This may allow the track 21 to have improved performances, such as by reducing noise, increasing standardization of the track 21, increasing durability of the track 21, allowing higher speed of the vehicle 10 before collapsing, etc. The preformed holes 68 of the projections $58_1$-$58_T$ each comprise a stud-receiving passage 70 configured to receive the elongated body 54 of the respective stud 50 and an enlarged cavity 72 disposed at an end 74 of the stud-receiving passage 70 at a depth DH within the respective traction projection $58_x$, cross-sectionally larger than the stud-receiving passage 70, and configured to receive the enlarged base 52 of the respective stud 50.

The configuration of the studs 50 may allow the studs 50 to remain anchored in the traction projections $58_1$-$58_T$ at a relatively high speed of the vehicle 10. For instance, in some embodiments, the studs 50 may allow the studs 50 to remain anchored in the traction projections $58_1$-$58_T$ at a speed of the vehicle 10 of at least 160 km/h, in some embodiments of at least 180 km/h, in some embodiments of at least 190 km/h, and in some embodiments even more (e.g., at least 200 km/h).

In this example, the track 21 comprises windows (i.e., openings) $40_1$-$40_H$ extending therethrough. The track 21 may comprise slide members $39_1$-$39_S$, which can sometimes be referred to as "clips", to slide against the sliding surfaces $77_1$, $77_2$ of the track-engaging assembly 24 to reduce friction and may be mounted via the windows $40_1$-$40_H$. In this case, the track 21 comprises window rows $41_1$, $41_2$ that include respective ones of the windows $40_1$-$40_H$ and are spaced apart from one another in the widthwise direction of the track 21.

The track-engaging assembly 24 is configured to drive and guide the track 21 around the track-engaging assembly 24.

Each of the drive wheels $22_1$, $22_2$ is rotatable by an axle for driving the track 21. That is, power generated by the prime mover 15 and delivered over the powertrain 12 of the snowmobile 10 rotates the axle, which rotates the drive wheels $22_1$, $22_2$, which impart motion of the track 21. In this embodiment, each drive wheel $22_i$ comprises a drive sprocket engaging some of the drive/guide lugs $34_1$-$34_D$ of the inner side 25 of the track 21 in order to drive the track 21. In other embodiments, the drive wheel $22_i$ may be configured in various other ways. For example, in embodiments where the track 21 comprises drive holes, the drive wheel $22_i$ may have teeth that enter these holes in order to drive the track 21. As yet another example, in some embodiments, the drive wheel $22_i$ may frictionally engage the inner side 25 of the track 21 in order to frictionally drive the track 21. The drive wheels $22_1$, $22_2$ may be arranged in other configurations and/or the track system 14 may comprise more or less drive wheels (e.g., a single drive wheel, more than two drive wheels, etc.) in other embodiments.

The idler wheels $26_1$, $26_2$, $28_1$-$28_6$, $30_1$, $30_2$ are not driven by power supplied by the prime mover 15, but are rather used to do at least one of guiding the track 21 as it is driven by the drive wheels $22_1$, $22_2$, tensioning the track 21, and supporting part of the weight of the snowmobile 10 on the ground via the track 21. More particularly, in this embodiment, the rear idler wheels $26_1$, $26_2$ are trailing idler wheels that maintain the track 21 in tension, guide the track 21 as it wraps around them, and can help to support part of the weight of the snowmobile 10 on the ground via the track 21. The lower roller wheels $28_1$-$28_6$ roll on the inner side 25 of the track 21 along the bottom run 66 of the track 21 to apply the bottom run 66 on the ground. The upper roller wheels $30_1$, $30_2$ roll on the inner side 25 of the track 21 along the top run 65 of the track 21 to support and guide the top run 65 as the track 21 moves. The idler wheels $26_1$, $26_2$, $28_1$-$28_6$, $30_1$, $30_2$ may be arranged in other configurations and/or the track assembly 14 may comprise more or less idler wheels in other embodiments.

The frame 23 of the track system 14 supports various components of the track-engaging assembly 24, including, in this embodiment, the idler wheels $26_1$, $26_2$, $28_1$-$28_6$, $30_1$, $30_2$. More particularly, in this embodiment, the frame 23 comprises an elongate support 62 extending in the longitudinal direction of the track system 14 along the bottom run 66 of the track 21 and frame members $49_1$-$49_F$ extending upwardly from the elongate support 62.

The elongate support 62 comprises rails $44_1$, $44_2$ extending in the longitudinal direction of the track system 14 along the bottom run 66 of the track 21. In this example, the idler wheels $26_1$, $26_2$, $28_1$-$28_6$ are mounted to the rails $44_1$, $44_2$. In this embodiment, the elongate support 62 comprises the sliding surfaces $77_1$, $77_2$ for sliding on the inner side 25 of the track 21 along the bottom run 66 of the track 21. Thus, in this embodiment, the idler wheels $26_1$, $26_2$, $28_1$-$28_6$ and the sliding surfaces $77_1$, $77_2$ of the elongate support 62 can contact the bottom run 66 of the track 21 to guide the track 21 and apply it onto the ground for traction. In this example, the sliding surfaces $77_1$, $77_2$ can slide against the inner surface 32 of the carcass 35 and can contact respective ones of the drive/guide lugs $34_1$-$34_D$ to guide the track 21 in motion. Also, in this example, the sliding surfaces $77_1$, $77_2$ are curved upwardly in a front region of the track system 14 to guide the track 21 towards the drive wheels $22_1$, $22_2$.

In this embodiment, the elongate support 62 comprises sliders $33_1$, $33_2$ mounted to respective ones of the rails $44_1$, $44_2$ and comprising respective ones of the sliding surfaces $77_1$, $77_2$. In this embodiment, the sliders $33_1$, $33_2$ are mechanically interlocked with the rails $44_1$, $44_2$. In other embodiments, instead of or in addition to being mechanically interlocked with the rails $44_1$, $44_2$, the sliders $33_1$, $33_2$ may be fastened to the rails $44_1$, $44_2$. For example, in some embodiments, the sliders $33_1$, $33_2$ may be fastened to the rails $44_1$, $44_2$ by one or more mechanical fasteners (e.g., bolts, screws, etc.), by an adhesive, and/or by any other suitable fastener.

In some examples, each slider $33_i$ may comprise a low-friction material which may reduce friction between its sliding surface $77_i$ and the inner side 25 of the track 21. For instance, the slider $33_i$ may comprise a polymeric material having a low coefficient of friction with the rubber of the track 21. For example, in some embodiments, the slider $33_i$ may comprise a thermoplastic material (e.g., a Hifax@ polypropylene). The slider $33_i$ may comprise any other suitable material in other embodiments. For instance, in some embodiments, the sliding surface $77_i$ of the slider $33_i$ may comprise a coating (e.g., a polytetrafluoroethylene (PTFE) coating) that reduces friction between it and the inner side 25 of the track 21, while a remainder of the slider $33_i$ may comprise any suitable material (e.g., a metallic material, another polymeric material, etc.).

While in embodiments considered above the sliding surface $77_i$ is part of the slider $33_i$ which is separate from and mounted to each rail $44_i$, in other embodiments, the sliding surface $77_i$ may be part of the rail $44_i$. That is, the sliding surface $77_i$ may be integrally formed (e.g., molded, cast, or machined) as part of the rail $44_i$.

The frame members $49_1$-$49_F$ extend upwardly from the elongate support 62 to hold the upper roller wheels $30_1$, $30_2$ such that the upper roller wheels $30_1$, $30_2$ roll on the inner side 25 of the track 21 along the top run 65 of the track 21.

The track system 14, including the track 21, may be implemented in any other suitable way in other embodiments.

For example, in a variant, the ground-engaging outer member 56 of the stud 50 may not have any enlarged head, i.e., it may not be larger than the elongated body 54 of the stud 50.

As another example, in a variant, at least some of (i.e., some of, a majority of, or an entirety of) the studs 50 of the track 21 may be parallel to the thickness-wise direction of the track 21.

As another example, in a variant, every stud 50 of the track 21 may have a similar configuration, a similar geometry and a similar material composition.

Figure 13:
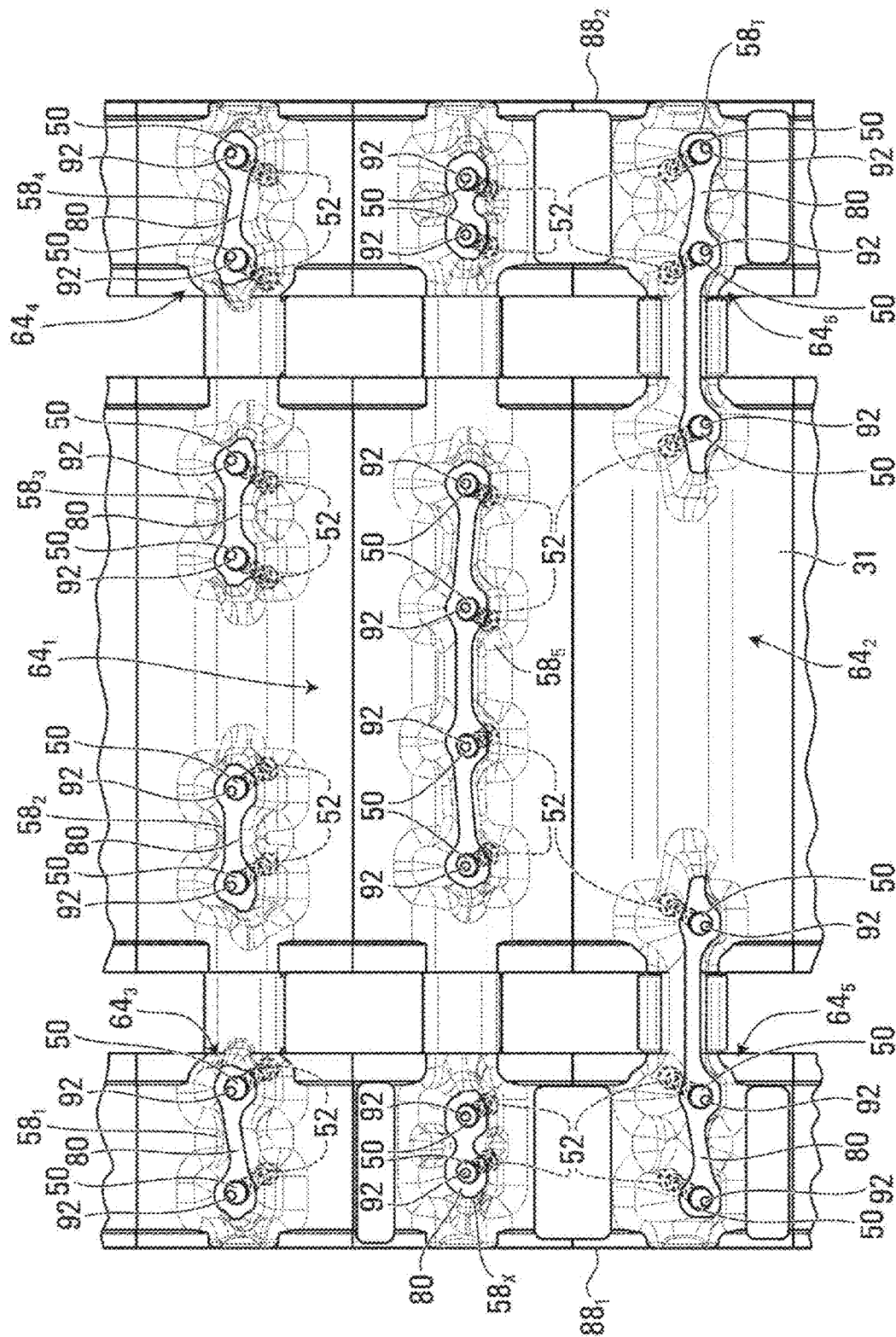
FIGS. 13 and 14 show variants of the track.

As another example, in a variant, as shown in FIG. 13, at least some of (i.e., some of, a majority of, or an entirety of) the studs 50 of the track 21 may be inclined relative to the widthwise direction of the track 21 in that the tip 92 of each stud 50 is laterally offset (i.e., offset in a lateral direction) relative to its respective base 52 in the widthwise direction of track 21, in addition to being inclined relative to the thickness-wise direction of the track 21 and relative to the longitudinal direction of the track 21. More specifically, in this embodiment, each stud 50 is inclined relative to the thickness-wise direction of the track 21, relative to the longitudinal direction of the track 21, and relative to the widthwise direction of track 21. In this embodiment, the studs 50 may comprise subsets $64_1$, $64_2$, $64_3$, $64_4$, wherein: each stud 50 of the subset $64_1$ is inclined such that when the stud 50 is located on the bottom run 66 of the track 21, the respective tip 92 is positioned more rearward and closer to the lateral edge $88_1$ of the track 21 than the respective base 92; each stud 50 of the subset $64_2$ is inclined such that when the stud 50 is located on the bottom run 66 of the track 21, the respective tip 92 is positioned more rearward and closer to the lateral edge $88_2$ of the track 21 than the respective base 92; each stud 50 of the subset $64_3$ is inclined such that when the stud 50 is located on the bottom run 66 of the track 21, the respective tip 92 is positioned more forward and closer to the lateral edge $88_1$ of the track 21 than the respective base 92; and each stud 50 of the subset $64_4$ is inclined such that when the stud 50 is located on the bottom run 66 of the track 21, the respective tip 92 is positioned more forward and closer to the lateral edge $88_2$ of the track 21 than the respective base 92.

Figure 14:
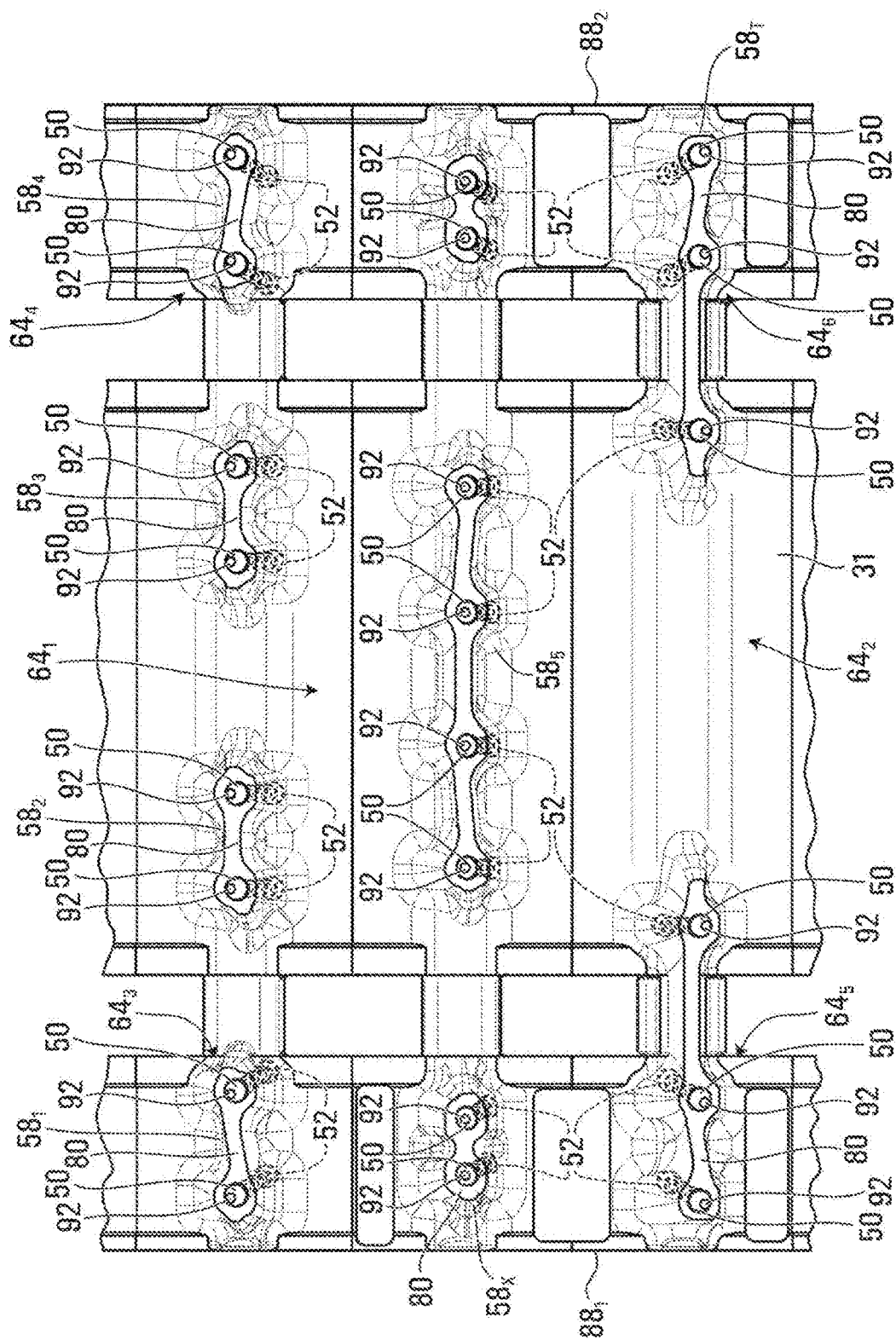
Figure 15:
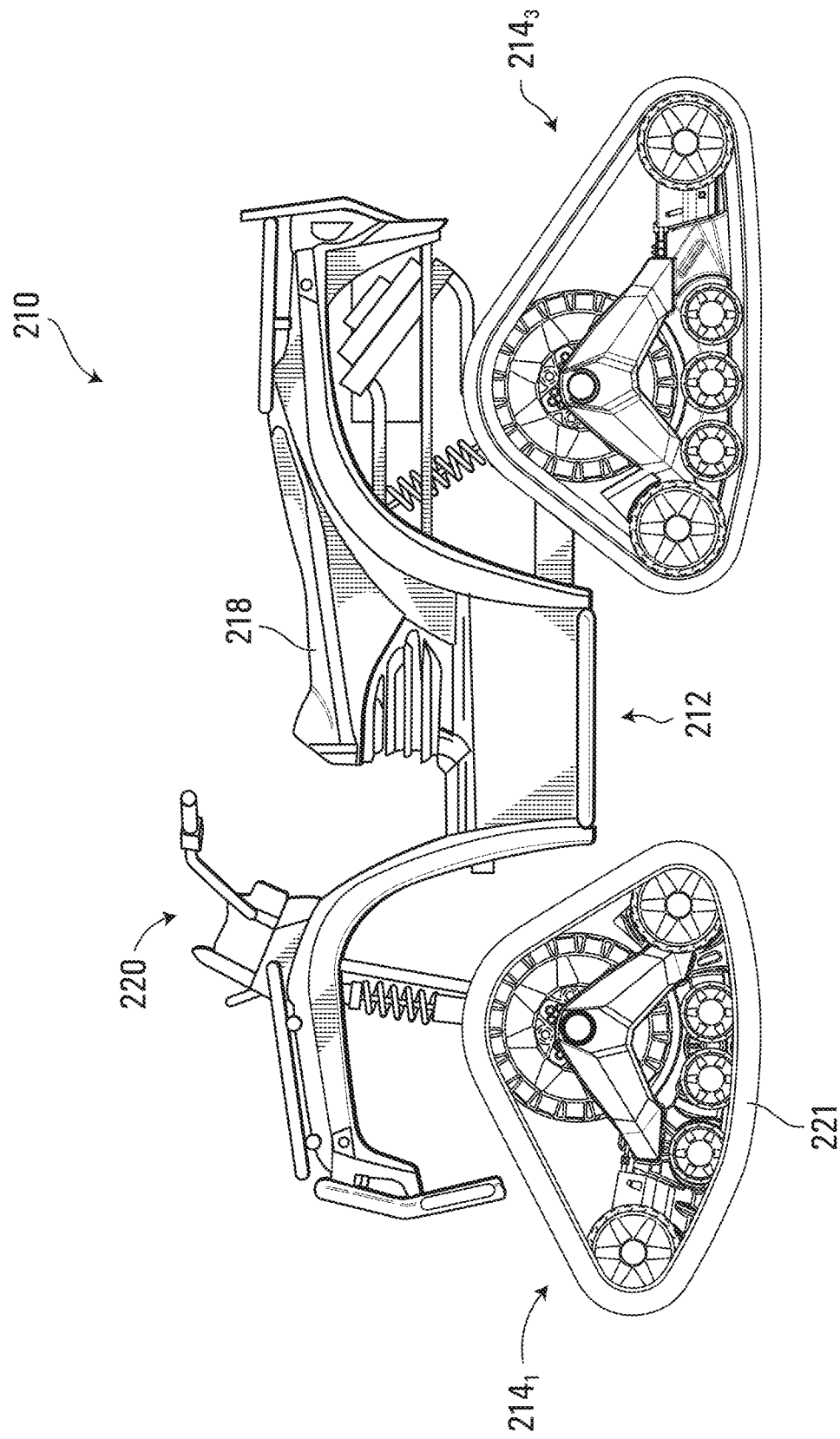
FIGS. 15 to 18 show an example of an all-terrain vehicle (ATV) comprising track systems in accordance with another embodiment, instead of being equipped with ground-engaging wheels.
Figure 16:
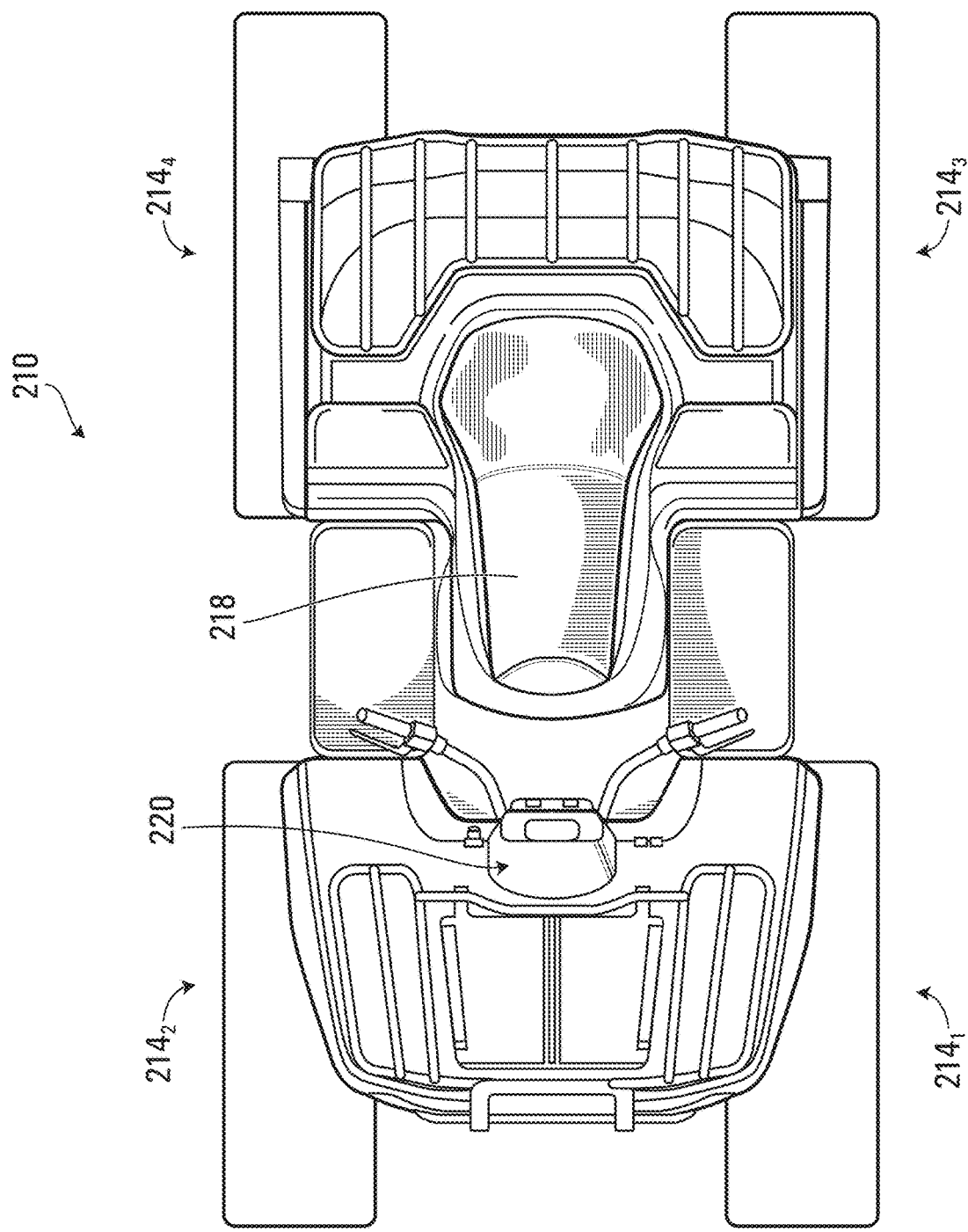
Figure 17:
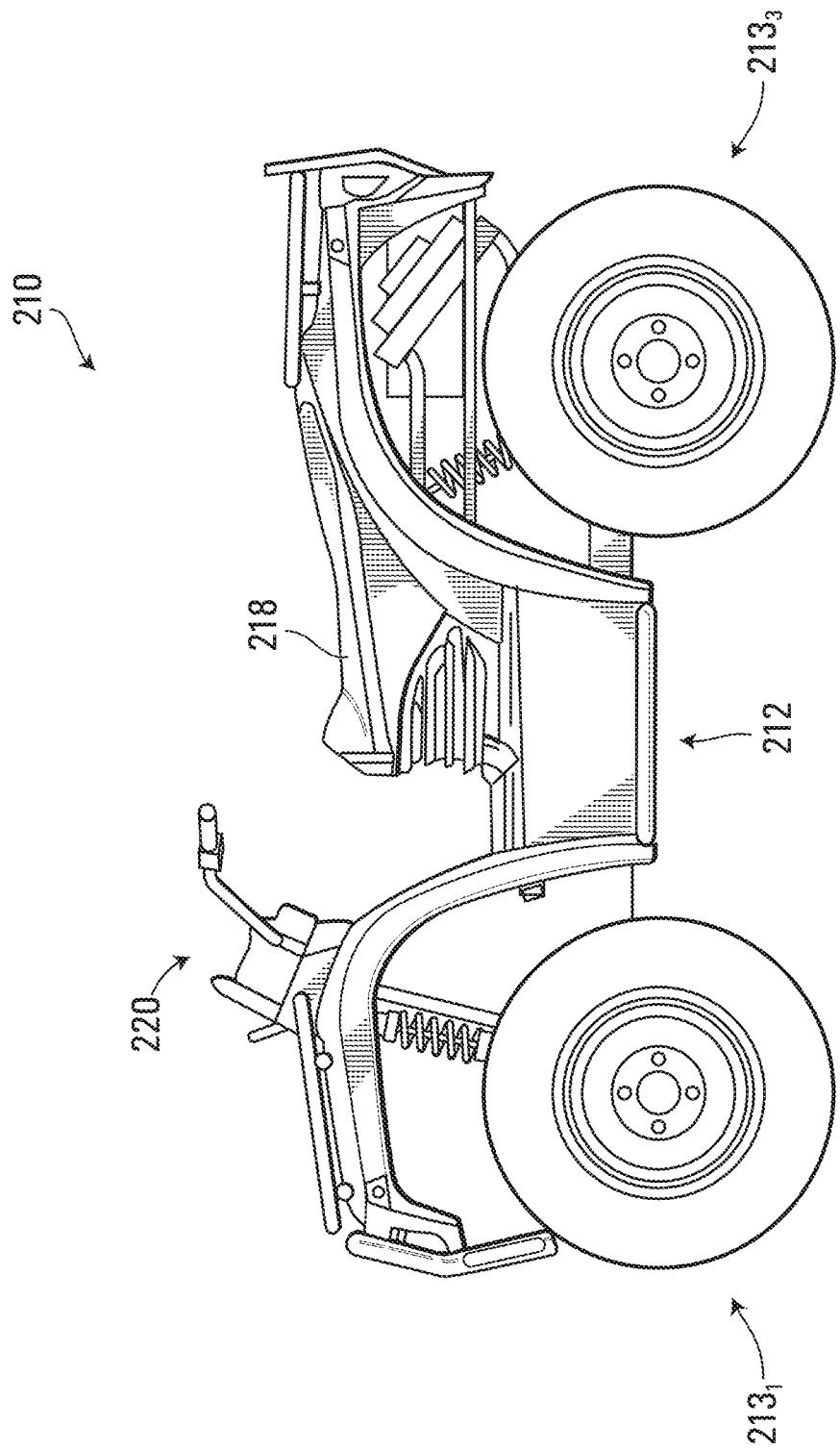
Figure 18:
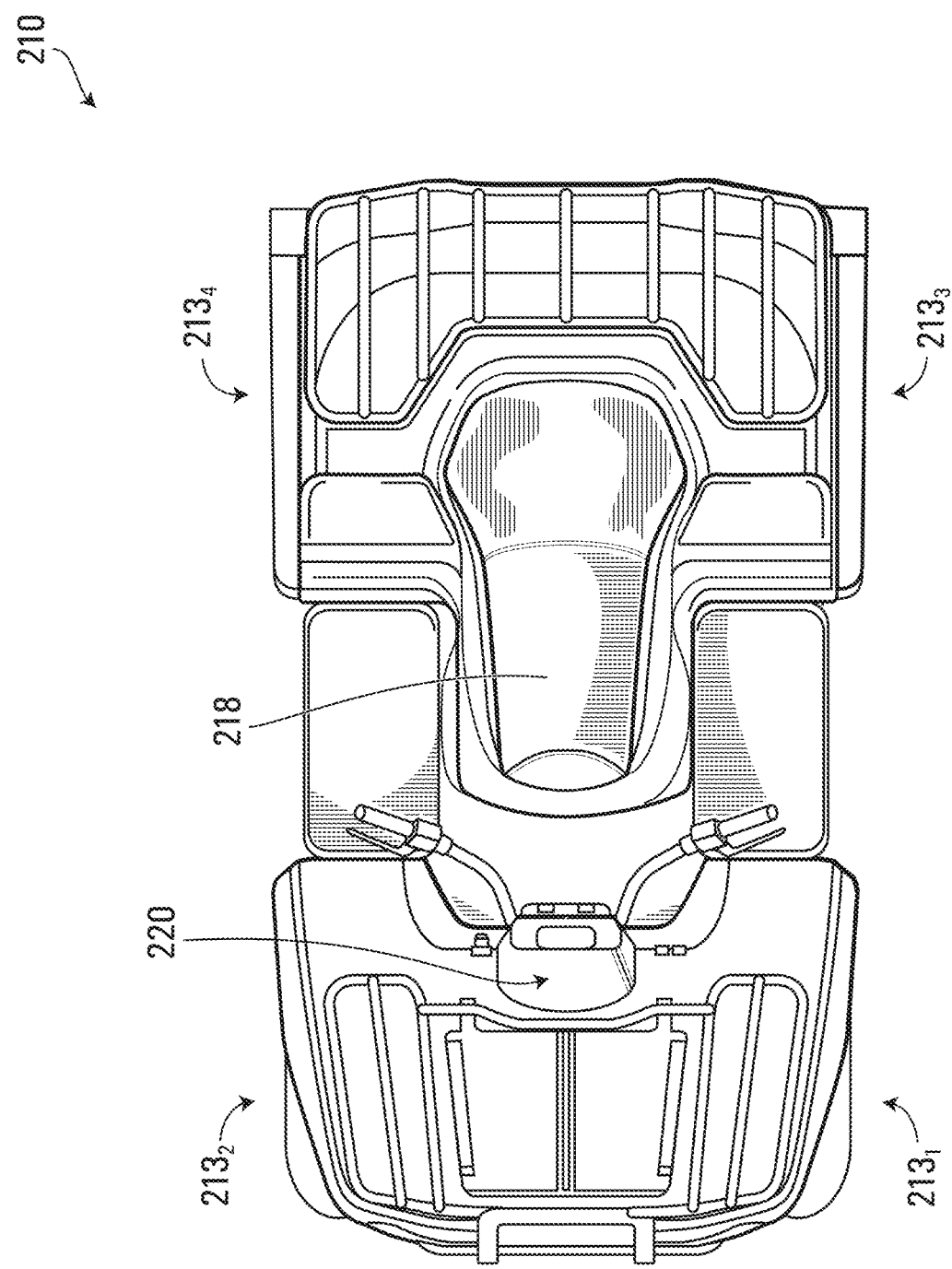

As another example, in a variant, as shown in FIG. 14, some but not all the studs 50 are inclined relative to the widthwise direction of the track 21, such that the studs 50 may comprise subsets $64_1$, $64_2$, $64_3$, $64_4$, $64_5$, $64_6$, wherein: each stud 50 of the subset $64_1$ is not inclined relative to the widthwise direction of the track 21 and is inclined such that when the stud 50 is located on the bottom run 66 of the track 21, the respective tip 92 is positioned more rearward than the respective base 92; each stud 50 of the subset $64_2$ is not inclined relative to the widthwise direction of the track 21 and is inclined such that when the stud 50 is located on the bottom run 66 of the track 21, the respective tip 92 is positioned more forward than the respective base 92; each stud 50 of the subset $64_3$ is inclined such that when the stud 50 is located on the bottom run 66 of the track 21, the respective tip 92 is positioned more rearward and closer to the lateral edge $88_1$ of the track 21 than the respective base 92; each stud 50 of the subset $64_4$ is inclined such that when the stud 50 is located on the bottom run 66 of the track 21, the respective tip 92 is positioned more rearward and closer to the lateral edge $88_2$ of the track 21 than the respective base 92; each stud 50 of the subset $64_5$ is inclined such that when the stud 50 is located on the bottom run 66 of the track 21, the respective tip 92 is positioned more forward and closer to the lateral edge $88_1$ of the track 21 than the respective base 92; and each stud 50 of the subset $64_6$ is inclined such that when the stud 50 is located on the bottom run 66 of the track 21, the respective tip 92 is positioned more forward and closer to the lateral edge $88_2$ of the track 21 than the respective base 92.

In some embodiments, certain parts of the track 21, including the studs 50, may be implemented as described in U.S. Patent Application Publication 2005/0168068, which is incorporated by reference herein.

While in embodiments considered above the track system 14 is part of the snowmobile 10, a track system including a track constructed according to principles discussed herein may be used as part of other off-road vehicles in other embodiments.

Figure 19:
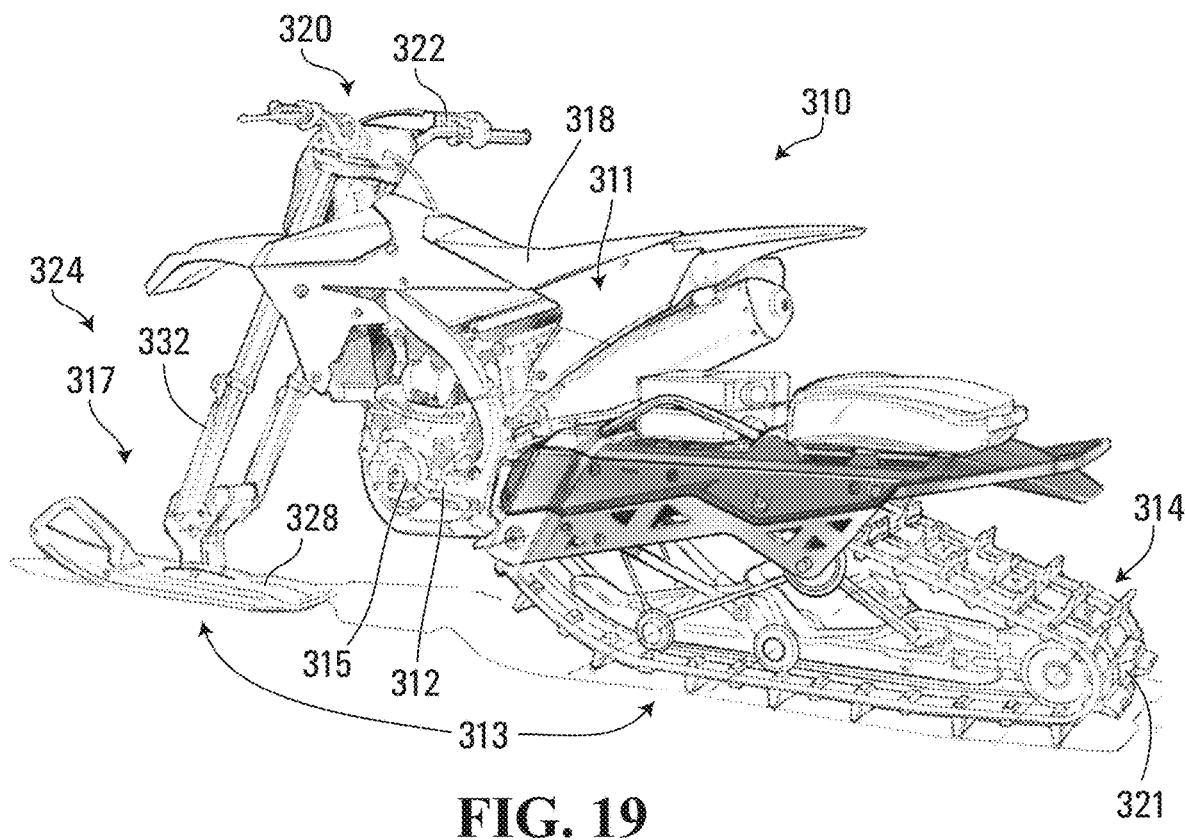
FIGS. 19 and 20 show an example of a snow bike comprising a track system in accordance with another embodiment, instead of being equipped with a rear wheel.

For example, in some embodiments, as shown in FIG. 19, a snow bike 310 comprises a frame 311, a powertrain 312, a ski system 317, a track system 314 including a track 321, a seat 318, and a user interface 320 which enables a user to ride, steer and otherwise control the snow bike 310, and the track 321 may be constructed according to principle discussed herein in respect of the track 21.

Figure 20:
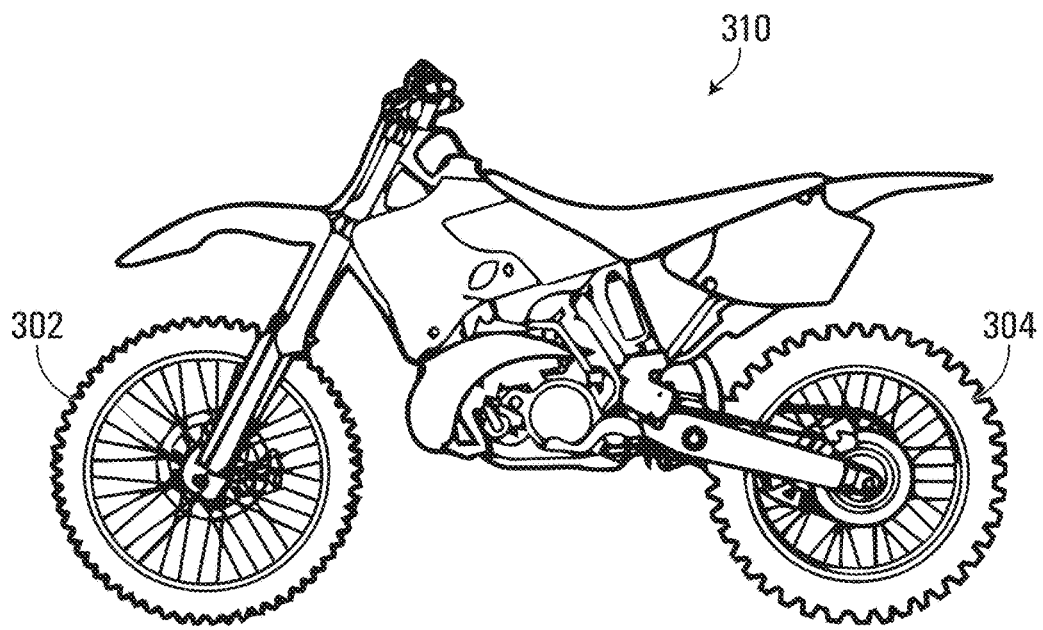

In this embodiment, as shown in FIG. 20, the snow bike 310 is a motorcycle equipped with the ski system 317 mounted in place of a front wheel 302 of the motorcycle 310 and the track system 314 mounted in place of a rear wheel 304 of the motorcycle 310. In this example, the track system 314 also replaces a rear suspension unit (e.g., a shock absorber and a swing arm) of the motorcycle. Basically, in this embodiment, the ski system 317 and the track system 314 are part of a conversion system 313 that converts the motorcycle into a skied and tracked vehicle for travelling on snow.

The powertrain 312 is configured for generating motive power and transmitting motive power to the track system 314 to propel the snow bike 310 on the ground. To that end, the powertrain 312 comprises a prime mover 315, which is a source of motive power that comprises one or more motors (e.g., an internal combustion engine, an electric motor, etc.). For example, in this embodiment, the prime mover 315 comprises an internal combustion engine. In other embodiments, the prime mover 315 may comprise another type of motor (e.g., an electric motor) or a combination of different types of motor (e.g., an internal combustion engine and an electric motor). The prime mover 315 is in a driving relationship with the track system 314. That is, the powertrain 312 transmits motive power from the prime mover 315 to the track system 314 in order to drive (i.e., impart motion to) the track system 314.

The seat 318 accommodates the user of the snow bike 310. In this case, the seat 318 is a straddle seat and the snow bike 310 is usable by a single person such that the seat 318 accommodates only that person driving the snow bike 310. In other cases, the seat 318 may be another type of seat, and/or the snow bike 310 may be usable by two individuals, namely one person driving the snow bike 310 and a passenger, such that the seat 318 may accommodate both of these individuals (e.g., behind one another).

The user interface 320 allows the user to interact with the snow bike 310 to control the snow bike 310. More particularly, in this embodiment, the user interface 320 comprises an accelerator, a brake control, and a steering device comprising handlebars 322 that are operated by the user to control motion of the snow bike 510 on the ground. The user interface 320 also comprises an instrument panel (e.g., a dashboard) which provides indicators (e.g., a speedometer indicator, a tachometer indicator, etc.) to convey information to the user.

The ski system 317 is disposed in a front 324 of the snow bike 310 to engage the ground and is turnable to steer the snow bike 310. To that end, the ski system 14 is turnable about a steering axis of the snow bike 310. The ski system 317 comprises a ski 328 to slide on the snow and a ski mount 330 that connects the ski 328 to a front steerable member 332 of the snow bike 310. In this embodiment where the snow bike 310 is a motorcycle and the ski system 317 replaces the front wheel 302 of the motorcycle, the front steerable member 332 comprises a front fork 334 of the snow bike 310 that would otherwise carry the front wheel 302.

The ski 328 is a sole ski of the snow bike 310. That is, the snow bike 310 has no other ski. Notably, the ski 328 is disposed in a center of the snow bike 310 in a widthwise direction of the snow bike 310. In this embodiment in which the snow bike 310 is a motocycle and the ski system 317 replaces the front wheel 302 of the motorcycle, the ski 328 contacts the ground where the front wheel 302 would contact the ground.

Any feature described herein with respect to the track system 14 of the snowmobile 10, including its track 21, may be applied to the track system 314 of the snow bike 310, including its track 321.

As another example, in some embodiments, as shown in FIGS. 15 to 18, an ATV 210 comprises a set of track systems $214_1$-$214_4$ providing traction to the ATV on the ground, where each of the track systems $214_1$-$214_4$ comprises a track 221 that may be constructed according to principle discussed herein in respect of the track 21.

The ATV 210 comprises a prime mover 212 in a driving relationship with the track systems $214_1$-$214_4$ via the ATV's powertrain, a seat 218, and a user interface 220, which enable a user of the ATV 210 to ride the ATV 210 on the ground. In this case, the seat 218 is a straddle seat and the ATV 210 is usable by a single person such that the seat 218 accommodates only that person driving the ATV 210. In other cases, the seat 218 may be another type of seat, and/or the ATV 210 may be usable by two individuals, namely one person driving the ATV 210 and a passenger, such that the seat 218 may accommodate both of these individuals (e.g., behind one another or side-by-side) or the ATV 210 may comprise an additional seat for the passenger. For example, in other embodiments, the ATV 210 may be a side-by-side ATV, sometimes referred to as a "utility terrain vehicle" or "UTV". The user interface 220 comprises a steering device operated by the user to control motion of the ATV 210 on the ground. In this case, the steering device comprises handlebars. In other cases, the steering device may comprise a steering wheel or other type of steering element. Each of the front track systems $214_1$, $214_2$ is pivotable about a steering axis of the ATV 210 in response to input of the user at the handlebars in order to steer the ATV 210 on the ground.

In this embodiment, each track system $214_i$ is mounted in place of a ground-engaging wheel $213_i$ that may otherwise be mounted to the ATV 210 to propel the ATV 210 on the ground. That is, the ATV 210 may be propelled on the ground by four ground-engaging wheels $213_1$-$213_4$ with tires instead of the track systems $214_1$-$214_4$. Basically, in this embodiment, the track systems $214_1$-$214_4$ may be used to convert the ATV 210 from a wheeled vehicle into a tracked vehicle, thereby enhancing its traction and floatation on the ground.

Any feature described herein with respect to the track system 14 of the snowmobile 10, including its track 21, may be applied to a track system $214_i$ of the ATV 210, including its track 221.

The snowmobile 10, the snow bike 310 and the ATV 210 considered above are examples of tracked recreational vehicles. While they can be used for recreational purposes, such tracked recreational vehicles may also be used for utility purposes in some cases.

In other embodiments, a track system constructed according to principles discussed herein may be used as part of an agricultural vehicle (e.g., a tractor, a harvester, etc.), as part of a construction vehicle, forestry vehicle or other industrial vehicle, or as part of a military vehicle.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A track for traction of a vehicle, the track being mountable around a track-engaging assembly comprising a plurality of wheels, the track being elastomeric to flex around the track engaging assembly, the track comprising:
    a carcass comprising a ground-engaging outer surface for engaging a ground and an inner surface opposite to the ground-engaging outer surface;
    a plurality of traction projections projecting from the ground-engaging outer surface; and
    a plurality of studs mounted to the traction projections and oriented transversally to a thickness-wise direction of the track, one or more of the plurality of studs being inclined relative to the thickness-wise direction of the track;
    wherein each traction projection of the traction projections comprises a lower portion and an upper portion that is configured to flex relative to the lower portion of the traction projection when the traction projection engages the ground; and
    wherein, when the vehicle is in motion and a particular one of the traction projections engages the ground, a stud of the studs that is mounted to the particular one of the traction projections moves towards being oriented normal to a surface of the ground.

2. The track of claim 1, wherein each traction projection of the traction projections comprises a top surface extending transversally to a longitudinal direction of the track.

3. The track of claim 2, wherein the top surface of the traction projection is inclined relative to the thickness-wise direction of the track.

4. The track of claim 3, wherein: the traction projection comprises a front surface and a rear surface opposite one another; and a given one of the front surface and the rear surface of the traction projection is inclined relative to the thickness-wise direction of track.

5. The track of claim 1, wherein: each of the studs comprises a tip and a base; and, for each stud of at least a subset of the studs, the tip of the stud of at least the subset of the studs is offset relative to the base of the stud of at least the subset of the studs in a longitudinal direction of track such that the tip of the stud of at least the subset of the studs is positioned more forward than the base of the stud of at least the subset of the studs.

6. The track of claim 5, wherein: the subset of the studs is a first subset of the studs; and, for each stud of a second subset of the studs, the tip of the stud the second subset of the studs is offset relative to the base of the stud of the second subset of the studs in the longitudinal direction of track such that the tip of the stud of the second subset of the studs is positioned more rearward than the base of the stud of the second subset of the studs.

7. The track of claim 6, wherein the first subset of the studs is larger in number than the second subset of the studs.

8. The track of claim 7, wherein the first subset of the studs is at least three fifths of the studs.

9. The track of claim 7, wherein the first subset of the studs is at least three quarters of the studs.

10. The track of claim 1, wherein each of particular ones of the studs is inclined relative to the thickness-wise direction of track and a widthwise direction of the track.

11. The track of claim 10, wherein: each of the studs comprises a tip and a base; for each stud of a first subset of the particular ones of the studs, the tip of the stud of the first subset of the particular ones of the studs is offset relative to the base of the stud of the first subset of the particular ones of the studs in the widthwise direction of the track such that the tip of the stud of the first subset of the particular ones of the studs is positioned closer to a first lateral edge of the track than the base of the stud of the first subset of the particular ones of the studs; and, for each stud of a second subset of the particular ones of the studs, the tip of the stud of the second subset of the particular ones of the studs is offset relative to the base of the stud of the second subset of the particular ones of the studs in the widthwise direction of the track such that the tip of the stud of the second subset of the particular ones of the studs is positioned closer to a second lateral edge of the track than the base of the stud of the second subset of the particular ones of the studs.

12. The track of claim 1, wherein a first subset of the studs are oriented in a first orientation and a second subset of the studs are oriented in a second orientation different from the first orientation.

13. The track of claim 12, wherein the first subset of the studs is larger in number than the second subset of the studs.

14. The track of claim 12, wherein the first subset of the studs is at least three fifths of the studs.

15. The track of claim 12, wherein the first subset of the studs is at least three quarters of the studs.

16. The track of claim 1, wherein the studs are configured to generate at least fifty scratch lines per turn of the track around the track-engaging assembly.

17. The track of claim 1, wherein the studs are configured to generate at least eighty scratch lines per turn of the track around the track-engaging assembly.

18. The track of claim 1, wherein a contact patch of the track with the ground includes at least 160 studs per square meter of the contact patch of the track.

19. The track of claim 1, wherein a contact patch of the track with the ground includes at least 240 studs per square meter of the contact patch of the track.

20. The track of claim 1, wherein: the traction projections are arranged in a plurality of rows spaced apart in and extending transversally to a longitudinal direction of the track; and each of plural ones of the rows of the traction projections includes more than six of the studs.

21. The track of claim 20, wherein each of the plural ones of the rows of the traction projections includes at least eight of the studs.

22. The track of claim 1, wherein: the traction projections are arranged in a plurality of rows spaced apart in and extending transversally to a longitudinal direction of the track; and a pattern of the studs that repeats along the track is defined over at least six of the rows of the traction projections.

23. The track of claim 1, wherein: the traction projections are arranged in a plurality of rows spaced apart in and extending transversally to a longitudinal direction of the track; and a pattern of the studs that repeats along the track is defined over at least ten of the rows of the traction projections.

24. The track of claim 1, wherein the stud comprises: an elongated body embedded within the particular one of the traction projections; and an enlarged head including a tip and exposed outside of the particular one of traction projections.

25. The track of claim 24, wherein: the stud comprises metal and carbide; and the enlarged head of the stud comprises a tip portion including at least part of the carbide and an enlarged portion larger than the tip portion and including at least part of the metal.

26. The track of claim 1, wherein the stud comprises: a ground-engaging outer member including a tip being exposed outside of the particular one of the traction projections: an enlarged base embedded within the particular one of the traction projections: an elongated body embedded within the particular one of the traction projections and extending from the ground-engaging outer member to the enlarged base; and a plurality of flanges projecting laterally from the elongated body.

27. The track of claim 26, wherein the flanges of the stud include at least three flanges.

28. The track of claim 26, wherein the ground-engaging outer member of the stud comprises an enlarged head.

29. The track of claim 28, wherein: the stud comprises metal and carbide; and the enlarged head of the stud comprises a tip portion including at least part of the carbide and an enlarged portion larger than the tip portion and including at least part of the metal.

30. The track of claim 1, wherein: the stud comprises a ground-engaging outer member projecting outwardly from a top surface of the particular one of the traction projections, exposed outside of the particular one of the traction projections, and including a tip of the stud; and a ratio of a height of the tip of the stud above the top surface of the particular one of the traction projections over a length of the stud is at least 20%.

31. The track of claim 1, wherein: the stud comprises a ground-engaging outer member projecting outwardly from a top surface of the particular one of the traction projections, exposed outside of the particular one of the traction projections, and including a tip of the stud; and a ratio of a height of the tip of the stud above the top surface of the particular one of the traction projections over a length of the stud is at least 30%.

32. The track of claim 1, wherein: the stud comprises a ground-engaging outer member projecting outwardly from a top surface of the particular one of the traction projections, exposed outside of the particular one of the traction projections, and including a tip of the stud; and a ratio of a height of the tip of the stud above the top surface of the particular one of the traction projections over a height of the particular one of the traction projections is at least 10%.

33. The track of claim 1, wherein: the stud comprises a ground-engaging outer member projecting outwardly from a top surface of the particular one of the traction projections, exposed outside of the particular one of the traction projections, and including a tip of the stud; and a ratio of a height of the tip of the stud above the top surface of the particular one of the traction projections over a height of the particular one of the traction projections is at least 20%.

34. The track of claim 1, wherein the stud comprises a ground-engaging outer member projecting outwardly from a top surface of the particular one of the traction projections, exposed outside of the particular one of the traction projections, and including a tip of the stud; and a height of the tip of the stud above the top surface of the particular one of the traction projections is at least $1/16$ inch.

35. The track of claim 1, wherein the stud comprises a ground-engaging outer member projecting outwardly from a top surface of the particular one of the traction projections, exposed outside of the particular one of the traction projections, and including a tip of the stud; and a height of the tip of the stud above the top surface of the particular one of the traction projections is at least $1/4$ inch.

36. The track of claim 1, wherein the particular one of the traction projections to which is mounted the stud comprises a preformed hole to receive the stud.

37. The track of claim 36, wherein: the stud comprises an elongated body embedded within the particular one of the traction projections and an enlarged base; and the preformed hole of the particular one of the traction projections comprises a stud-receiving passage configured to receive the elongated body of the stud and an enlarged cavity disposed at an end of the stud-receiving passage at a depth within the particular one of the traction projections, cross-sectionally larger than the stud-receiving passage, and configured to receive the enlarged base of the stud.

38. The track of claim 1, wherein the particular one of the traction projections comprises: a stud-mounting portion to which is mounted the stud; and a transversal portion that extends from the stud-mounting portion of the particular one of the traction projections and transversally to a longitudinal direction of the track and that is smaller than the stud-mounting portion of the particular one of the traction projections in the longitudinal direction of the track.

39. The track of claim 38, wherein: the stud-mounting portion of the particular one of the traction projections is a first stud-mounting portion of the traction projection; the stud is a first stud: the particular one of the traction projections comprises a second stud-mounting portion to which is mounted a second stud of the studs; and the transversal portion of the traction projection extends from the first stud-mounting portion of the traction projection to the second stud-mounting portion of the traction projection and is smaller than the second stud-mounting portion of the traction projection in the longitudinal direction of the track.

40. The track of claim 39, wherein the transversal portion of the traction projection is a first transversal portion and the traction projection comprises: a third stud-mounting portion to which is mounted a third stud of the studs; and a second transversal portion that extends from the second stud-mounting portion of the traction projection to the third stud-mounting portion of the traction projection and is smaller than each of the second stud-mounting portion and the third stud-mounting portion of the traction projection in the longitudinal direction of the track.

41. The track of claim 40, wherein the traction projection comprises: a fourth stud-mounting portion to which is mounted a fourth stud of the studs; and a third transversal portion that extends from the third stud-mounting portion of the traction projection to the fourth stud-mounting portion of the traction projection and is smaller than each of the third stud-mounting portion and the fourth stud-mounting portion of the traction projection in the longitudinal direction of the track.

42. The track of claim 1, wherein the studs are configured to remain anchored in the traction projections at a speed of at least 160 km/h of the vehicle.

43. The track of claim 1, wherein the studs are configured to remain anchored in the traction projections at a speed of at least 180 km/h of the vehicle.

44. The track of claim 1, wherein a first subset of the studs that is mounted to respective traction projections move towards being oriented normal to the surface of the ground when the vehicle is in motion in a forward direction.

45. The track of claim 44, wherein a second subset of the studs that is mounted to respective traction projections move towards being oriented normal to the surface of the ground when the vehicle is in motion in a rearward direction.

46. The track of claim 45, wherein the first subset of the studs is larger in number than the second subset of the studs.

* * * * *